(12) United States Patent
Gabriel

(10) Patent No.: US 7,258,313 B2
(45) Date of Patent: Aug. 21, 2007

(54) METHOD FOR LEVELING AN OBJECT

(75) Inventor: Edward Gabriel, New City, NY (US)

(73) Assignee: Sturm, Ruger & Company, Inc., Southport, CT (US)

( * ) Notice: Subject to any disclaimer, the term of this patent is extended or adjusted under 35 U.S.C. 154(b) by 355 days.

(21) Appl. No.: 10/809,598

(22) Filed: Mar. 24, 2004

(65) Prior Publication Data
US 2004/0206196 A1    Oct. 21, 2004

Related U.S. Application Data

(62) Division of application No. 10/085,815, filed on Feb. 26, 2002, now Pat. No. 6,729,590.

(60) Provisional application No. 60/351,472, filed on Jan. 23, 2002.

(51) Int. Cl.
*F16M 11/24* (2006.01)
*B66F 3/16* (2006.01)

(52) U.S. Cl. .......................... 248/182; 248/673; 254/97

(58) Field of Classification Search ............. 248/188.2, 248/188.5, 188.8, 188, 673, 676, 677; 254/97, 254/103, 420, 425, 427; 74/606 R
See application file for complete search history.

(56) References Cited

U.S. PATENT DOCUMENTS

| | | | | |
|---|---|---|---|---|
| 1,417,639 A | | 5/1922 | Sterner .................... 248/188.4 |
| 1,444,931 A | * | 2/1923 | Mayer ........................ 254/103 |
| 3,921,958 A | * | 11/1975 | Brockelsby et al. ......... 254/420 |
| 3,954,241 A | | 5/1976 | Carlson .................... 248/188.3 |
| 3,991,962 A | | 11/1976 | Kovats ...................... 248/188.5 |
| 4,068,815 A | | 1/1978 | Losert ...................... 248/188.2 |
| 4,093,181 A | * | 6/1978 | Ivins ............................. 254/97 |
| 4,262,870 A | | 4/1981 | Kretchman et al. ...... 248/188.3 |
| 4,368,869 A | | 1/1983 | Gelvezon et al. ........... 248/656 |
| 4,518,142 A | | 5/1985 | Sulcek et al. ............... 248/649 |
| 4,702,458 A | * | 10/1987 | Kendrick ...................... 254/97 |

(Continued)

OTHER PUBLICATIONS

Nook Industries Inc., Actionjac Machine Screw Jacs, Installation, Maintenance and Lubrication Instructions, Oct. 1, 2000, pp. 1-12.

(Continued)

*Primary Examiner*—Carl D. Friedman
*Assistant Examiner*—Tan Le
(74) *Attorney, Agent, or Firm*—Duane Morris, LLP

(57) ABSTRACT

A device for leveling an object on uneven or sloping floors. The device is comprised of a housing with a substantially hollow portion having a worm gear, a driven gear, and an elevation shaft with threads on at least a portion of the shaft's external surface. The worm gear operably engages the driven gear, which in turn operably engages the elevation shaft. When the worm gear is rotated in opposite directions, concomitant rotations of the driven gear cause the elevation shaft to move axially up or down, thereby providing leveling motions to an object to which the device is attached. A pad may be attached to one end of the elevation to prevent scratching the surface on which the object rests. The hollow portion of the housing is configured to provide at least one load-bearing surface such that no separate bearings are required with the device.

21 Claims, 14 Drawing Sheets

U.S. PATENT DOCUMENTS

| | | | |
|---|---|---|---|
| 4,801,114 A | 1/1989 | Price | 248/188.3 |
| 4,974,801 A | 12/1990 | Pulsifer | 248/181 |
| 5,199,738 A | 4/1993 | VanDenberg | 280/766.1 |
| 5,292,095 A | 3/1994 | Cattaneo | 248/188.4 |
| 5,421,555 A * | 6/1995 | Sims | 254/420 |
| 5,553,825 A | 9/1996 | Rasmussen | 248/354.3 |
| 5,697,586 A * | 12/1997 | Lybarger | 248/188.4 |
| 5,732,913 A | 3/1998 | Shin | 248/188.2 |
| 5,749,550 A | 5/1998 | Jackson | 248/188.2 |
| 5,967,472 A * | 10/1999 | Wilhelmstatter et al. | 248/188.4 |
| 5,991,974 A | 11/1999 | Carpinella | 16/42 R |
| 6,219,882 B1 | 4/2001 | Olson | 16/42 R |
| 6,446,937 B1 | 9/2002 | Straw et al. | 254/425 |
| 6,729,590 B2 * | 5/2004 | Gabriel | 248/188.2 |
| 2004/0206196 A1 * | 10/2004 | Gabriel | 74/89.14 |

OTHER PUBLICATIONS

Joyce Corp. Catalog Excerpts; Engineering Overview-Jack Designs, Oct. 20, 2000, pp. 3-5, 18.

* cited by examiner

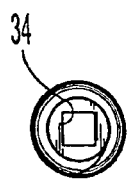 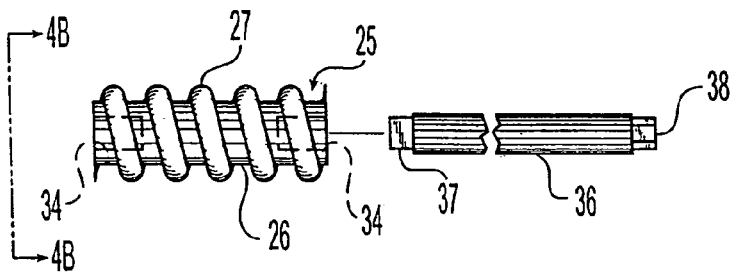
*Fig. 4B*  *Fig. 4A*  *Fig. 4C*
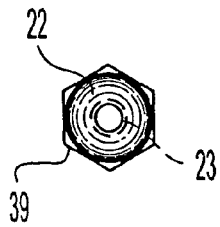 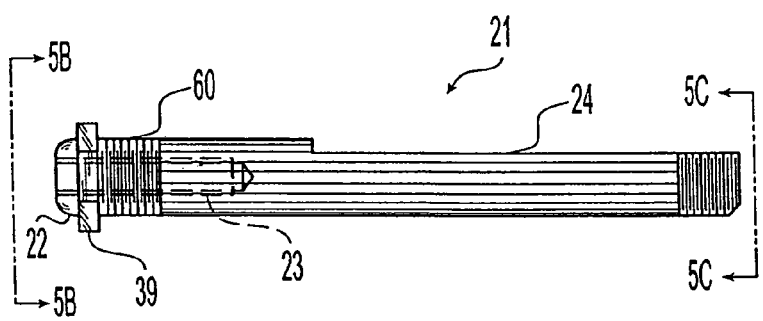
*Fig. 5B*  *Fig. 5A*
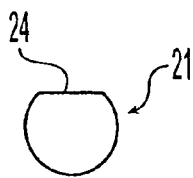 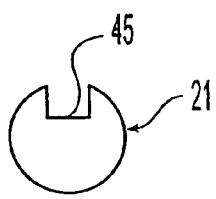 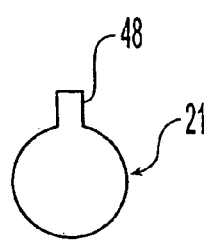
*Fig. 5C*  *Fig. 5D*  *Fig. 5E*

METHOD FOR LEVELING AN OBJECT

CROSS-REFERENCE TO RELATED APPLICATIONS

This is a divisional of U.S. patent application Ser. No. 10/085,815 filed Feb. 26, 2002 now U.S. Pat. No. 6,729,590, entitled "Leveling Device," which takes priority from U.S. Provisional Patent Application Ser. No. 60/351,472 filed Jan. 23, 2002, both of which are incorporated in their entirety herein by reference.

FIELD OF THE INVENTION

The present invention generally relates to a leveling device, and more particularly to an improved device for leveling objects that rest on a floor or other substantially horizontal, but yet uneven or sloping surface.

BACKGROUND OF THE INVENTION

The need to install and level objects on uneven or sloping floors has presented a longstanding problem, especially for various types of apparatuses including machines and appliances. Often floors are not plumb or perfectly flat, yet it is important that all the legs of an object contact the floor to provide adequate support and to equally distribute the weight of the object. If all the legs do not contact the floor, many problems can develop. For example, the outer cabinet and frame of an apparatus may become distorted over time due to nonuniform weight support, thereby impairing the proper operation of the apparatus. For example, this is especially true of refrigeration units, freezers, and ice machines which rely on a level installation to achieve proper sealing of their door gaskets. In the case of a motorized apparatus such as a washing machine, inadequate contact of all its legs with the floor is especially problematic because these devices have a tendency to vibrate and "walk" across the floor if the floor is not level. Annoying "rocking" problems with an apparatus may also result where the legs do not all contact the floor. Moreover, installations that are not level may be aesthetically undesirable by the inability to match the heights of adjacent cabinets, other equipment, or work surfaces.

Installers and manufacturers have attempted to resolve the leveling problem by developing approaches to compensate for uneven and sloping floors. Where the height of apparatus legs is not adjustable, for example, one such approach used by installers has been to place shims or wedges made of a suitable material under the legs. Obviously, this technique has numerous drawbacks. First, the apparatus must be manually lifted while such shims are placed under the legs, thereby often requiring more than one installer. This situation also increases the potential risk of back or other physical injuries to the installers. Second, the shims are not permanently mounted to the apparatus legs and may shift over time or become completely dislodged. This is especially problematic with motorized apparatuses which vibrate and "walk" as described above.

Manufacturers have attempted to resolve the leveling problem with numerous design approaches. One technique which has been employed is to provide manually adjustable legs or supports, often referred to commercially as glides or levelers, under each corner of the apparatus's outer cabinet. This consists primarily of a threaded vertical rod which on one end is screwed into a female threaded coupling near the apparatus's corners. The rod typically has a pad or flattened base of some sort disposed on the opposite end which contacts the floor. The pad may also swivel or tilt relative to the longitudinal axis of the vertical rod. These manually adjustable supports, however, are still plagued by many of the problems encountered with the shim technique described above. For example, in many cases, the apparatus must be lifted manually to unload weight from the legs in order to rotate them and adjust their height. Furthermore, there is usually no way to access the rear legs for adjustment once the apparatus is slid into its final position because access is often not available from the rear or sides of the apparatus. This is particularly true of kitchen appliances such as refrigerators and dishwashers which are usually placed against a wall in the rear and have other equipment, cabinets, or a wall positioned against one or both sides of the apparatus. The manually adjustable leg design is also cumbersome to use, involving a time consuming trial and error approach to leveling the apparatus on uneven floors. The apparatus must often be slid into and out of its final position numerous times while gradual adjustments are made to the otherwise inaccessible rear support legs in hopes of finding the proper height of each rear leg.

Other approaches have been used with limited success in an attempt to overcome the many problems of leveling objects on uneven floors. For example, U.S. Pat. No. 4,518,142 to Sulcek et al. discloses a leveling system for appliances utilizing manually adjustable wheels or rollers for rear supports. Even though the appliance may be easier to push into its final position, the height of the rear supports must be adjusted before the appliance is slid into place, often without access to the final resting position of the rear supports on the floor. U.S. Pat. No. 5,749,550 to Jackson discloses a rear leveling system for refrigerators using rollers for rear supports. Although the rear supports are adjustable from the front of the appliance, the mechanism is complicated and requires virtually all parts to be fabricated from metal. Like many similar mechanisms, the manufacturing costs are high and they are prone to problems due to their complex design.

Accordingly, there is a need for a leveling device that is simple in design, economical to produce, and allows adjustment of the height of the rear supports or legs after the object is in place.

BRIEF SUMMARY OF THE INVENTION

The invention is generally directed to an adjustable leveling device which can be used for any object, including various apparatuses such as equipment and appliances.

In accordance with one embodiment, the leveling device is comprised of a housing having a base portion, a top portion, and a substantially hollow portion disposed between the base and top portions. The hollow portion is adapted and configured to provide at least one load-bearing surface. In one embodiment, the housing may be fabricated by machining. In another embodiment, the housing may be made of plastic which in one embodiment is fabricated by molding.

The leveling device further comprises an elevation shaft having a longitudinal axis which may be disposed at least partially within the hollow portion and may have threads on at least a portion of its external surface. A means for restraining the elevation shaft from rotating relative to the housing may also be provided. In one embodiment, the elevation shaft restraining means comprises an opening disposed in the top portion of the housing through which the elevation shaft extends, the opening having a flat surface and a flat portion is configured on the elevation shaft to operably engage the flat surface in the opening to prevent the shaft from rotating. In another embodiment, the shaft restraining means comprises a slot extending along a portion of the longitudinal axis of the elevation shaft, an opening disposed in the top portion of the housing through which the elevation shaft extends, and the opening having a key to operably engage the slot to prevent rotation of the shaft. In yet another embodiment, the shaft restraining means comprises a key extending along a portion of the longitudinal axis of the shaft, an opening disposed in the top portion of the housing through which the shaft extends, and the opening having a slot to operably engage the key to prevent rotation of the shaft.

In accordance with one embodiment, the elevation shaft is axially movable to allow at least one end of the shaft to be completely retracted into the housing.

The leveling device further comprises a worm gear which may be disposed within the hollow portion of the housing. The worm gear has teeth and at least one end of the worm gear may have an extension protruding out from the housing which may be configured to facilitate rotation of the worm gear. The extension may be configured to receive a tool to rotate the worm gear, which in one embodiment may be a hex head. In accordance with one embodiment of the leveling device, the worm gear is made of plastic.

The leveling device further comprises a driven gear which may have internal threads that are engaged with the threads of the elevation shaft and external teeth that are engaged with the teeth of the worm gear. The driven gear is adapted and configured to operably engage the at least one load-bearing surface of the hollow portion of the housing such that no separate bearings are required with the leveling device.

In one embodiment, the driven gear may be a spur gear. However, in another embodiment, the driven gear may be a helical gear. The driven gear may also include a stem. In accordance with one embodiment, the driven gear may be made of plastic.

When the worm gear is rotated in opposite directions, concomitant rotations of the driven gear cause the elevation shaft to move axially up or down to provide leveling motions to an object attached to the leveling device.

The device further comprises a means for retaining the driven gear within the hollow portion of the housing. In one embodiment, the means for retaining the driven gear within the substantially hollow portion of the housing may be a collar that is fastened within an opening in the base portion. In another embodiment, the driven gear retaining means may be a load-bearing block that is fastened within an opening in the base portion; the block having a hole configured and adapted to receive the elevation shaft.

In accordance with one embodiment of the leveling device, a means may be connected to one end of the elevation shaft for protecting a nonuniform surface from damage by contact of the end of the shaft with the surface. In one embodiment, the surface protecting means may comprise a pad shaped as a round disk. In one embodiment, the elevation shaft is axially movable such that the pad may be completely retracted into the housing of the leveling device. In another embodiment, the pad may be rotably connected to the end of the elevation shaft to permit independent relative rotation between the pad and the shaft. The pad in yet another embodiment may be movably attached to the end of the elevation shaft to permit the pad to tilt at an angle relative to a plane perpendicular to the longitudinal axis of the shaft. In one embodiment, the angle may range from 0 to about 5 degrees.

In accordance with another embodiment of the leveling device, the surface protecting means may comprise a roller. In one embodiment, the roller may be pivotally mounted to the end of the elevation shaft to permit swiveling of the roller around the elevation shaft.

In accordance with one embodiment of the leveling device, the housing is adapted and configured to attach to an object. The top portion of the housing may be situated opposite the base portion of the housing, and each such portion may have at least one opening. The hollow portion of the housing may further comprise a first internal compartment with a first cross-sectional area parallel to the base portion and a second internal compartment with a second cross-sectional area parallel to the base portion. The second cross-sectional area may be smaller than the first cross-sectional area. The first internal compartment communicates with the second internal compartment and the at least one opening in the base portion. The second internal compartment communicates with the at least one opening in the top portion of the housing. A stepped transition may be provided between the first and second internal compartment which is adapted and configured to define at least one load-bearing surface. In one embodiment, the driven gear may have a top and bottom wherein the top contacts the load-bearing surface of the stepped transition without any separate bearings.

In accordance with one embodiment of the leveling device, the driven gear may be disposed in the first internal compartment of the housing. A stem may also be provided in another embodiment extending from the top of the driven gear, wherein the stem may be disposed in the second internal compartment of the housing.

In accordance with another embodiment of the housing of the leveling device, the hollow portion may define a gear cavity having a first cross-sectional area parallel to the base portion of the housing. The hollow portion may further define a gear stem cavity having a second cross-sectional area parallel to the base portion of the housing which is smaller than the cross-sectional area of the gear cavity. The gear stem cavity may communicate with the opening in the top portion of the housing wherein the gear cavity is coaxially aligned with the gear stem cavity and a stepped transition is formed between the gear cavity and the gear stem cavity; the stepped transition providing a load-bearing surface.

In another embodiment of the leveling device, the housing may comprise a substantially rectangular cavity for the worm gear. The worm gear cavity may have an open top, a closed bottom, two elongated sides, and two ends with an opening disposed in each end. The shape of the closed bottom may be semi-circular.

In accordance with one embodiment, the housing of the leveling device may be adapted and configured to attach to an object in an inverted position whereby the base portion is oriented upwardly and the top portion is oriented downwardly. In this embodiment, a load-bearing block may be inserted within the opening in the base portion of the housing, the block having a hole configured and adapted to receive the elevation shaft, thereby providing a load-bearing surface for support of the load imposed on the leveling device by the object.

A method for leveling an object is also provided which may comprise the steps of:
 (a) providing at least two leveling devices each comprising:
  a housing having a base portion, a top portion, and a substantially hollow portion;

an elevation shaft having a longitudinal axis disposed at least partially within the hollow portion, at least a portion of the shaft having threads on its external surface;

a worm gear having teeth disposed within the housing, at least one end of the worm gear having an extension protruding out from the housing and configured to receive a tool to facilitate rotation of the worm gear;

a driven gear disposed within the hollow portion having internal threads engaged with the threads of the elevation shaft and external gear teeth engaged with the teeth of the worm gear;

means for retaining the driven gear within the hollow portion; and means for restraining the elevation shaft from rotating relative to the housing, whereby upon rotation of the worm gear in opposite directions and concomitant rotations of the driven gear, the elevation shaft is caused to move axially up or down;

(b) providing a tool configured to operably engage the at least one end of the worm gear extending out from the housing;

(c) providing an object to which the at least two leveling devices are mounted, the object providing access for the tool to engage the at least two leveling devices;

(d) engaging the tool with the extension of the at least one end of the worm gear protruding out from the housing of one of the at least two leveling devices; and (e) rotating the worm gear of one of the at least two leveling devices with the tool to raise or lower the object.

In one embodiment, the method for leveling an object described above comprises rotating the worm gear of at least one of the leveling devices to level an object. In another embodiment, the method for leveling an object described above comprises rotating the worm gear of both leveling devices to level object. In accordance with one embodiment, an appliance is the object to be leveled by the method described above.

BRIEF DESCRIPTION OF THE DRAWINGS

The features and advantages of the present invention will become more readily apparent from the following detailed description of the invention in which like elements are labeled similarly and in which:

FIG. 4A is a side view of the worm gear of the leveling device of FIGS. 1A, 1B, or 1C;

FIG. 4B is an end view of the worm gear of FIG. 4A of the leveling device of FIGS. 1A, 1B, or 1C;

FIG. 4C is a side view of the extension rod which may be used with the worm gear of FIG. 4A of the leveling device of FIGS. 1A, 1B, or 1C;

FIG. 5A is a side view of the elevation shaft of the leveling device of FIG. 1A which depicts an end configuration adapted to receive a pad;

FIG. 5B is an end view of the elevation shaft of FIG. 5A of the leveling device of FIG. 1A viewed from the end adapted to receive a pad;

FIG. 5C is an end view of the elevation shaft of FIG. 5A of the leveling device of FIG. 1A viewed from the end opposite FIG. 5B;

FIG. 5D is an end view of an optional elevation shaft of the leveling device of FIGS. 1A, 1B, or 1C viewed from the end opposite FIG. 5B;

FIG. 5E is an end view of another optional elevation shaft of the leveling device of FIGS. 1A, 1B, or 1C viewed from the end opposite FIG. 5B;

DETAILED DESCRIPTION OF THE INVENTION

Figure 1A:
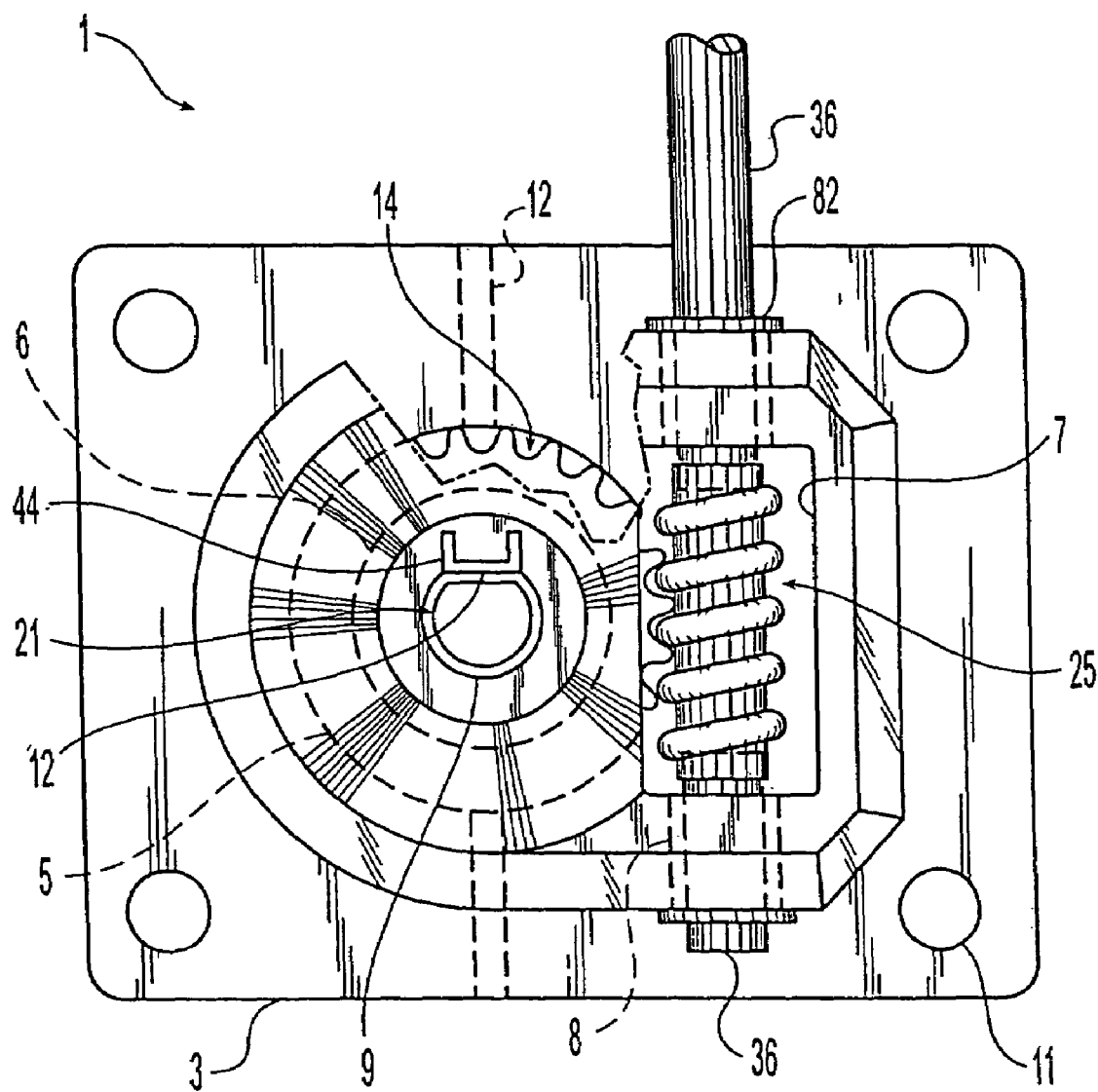
FIG. 1A is a top plan view of one embodiment of the leveling device of the present invention in which the worm gear is visible and further shown with the housing partially cut away to reveal the driven gear.

A first embodiment of the leveling device 1 is shown in FIGS. 1A & B as generally including a housing 2, a worm gear 25, a driven gear 14 having internal threads 61, and a threaded elevation shaft 21. A retaining collar 28 may be provided which holds the driven gear 14 inside the housing 2. A pad 30 may also be disposed on the lower end of the elevation shaft as shown. Leveling devices such as the present invention are installed on the bottom of an object, such as an appliance for example, where they function as a leg or support that may be adjusted to level the object when installed on a nonuniform surface. Basically, the leveling device 1 operates by rotating the worm gear 25 which causes concomitant rotations of the driven gear 14. The internal threads of the rotating driven gear 14 engage the threads of the elevation shaft 21. Since means are provided to prevent or restrain the shaft 21 from rotating in relation to the housing 2 (described hereafter), rotation of the driven gear 14 is translated into only an axial up or down motion of the shaft by the threaded connection between these two components. Depending on the direction in which the driven gear 14 is rotated, this causes the elevation shaft to be raised or lowered, thereby imparting the same, but opposite leveling motions to the object attached to the leveling device 1 (i.e., lowering the elevation shaft raises the object, and vice-versa).

Figure 1B:
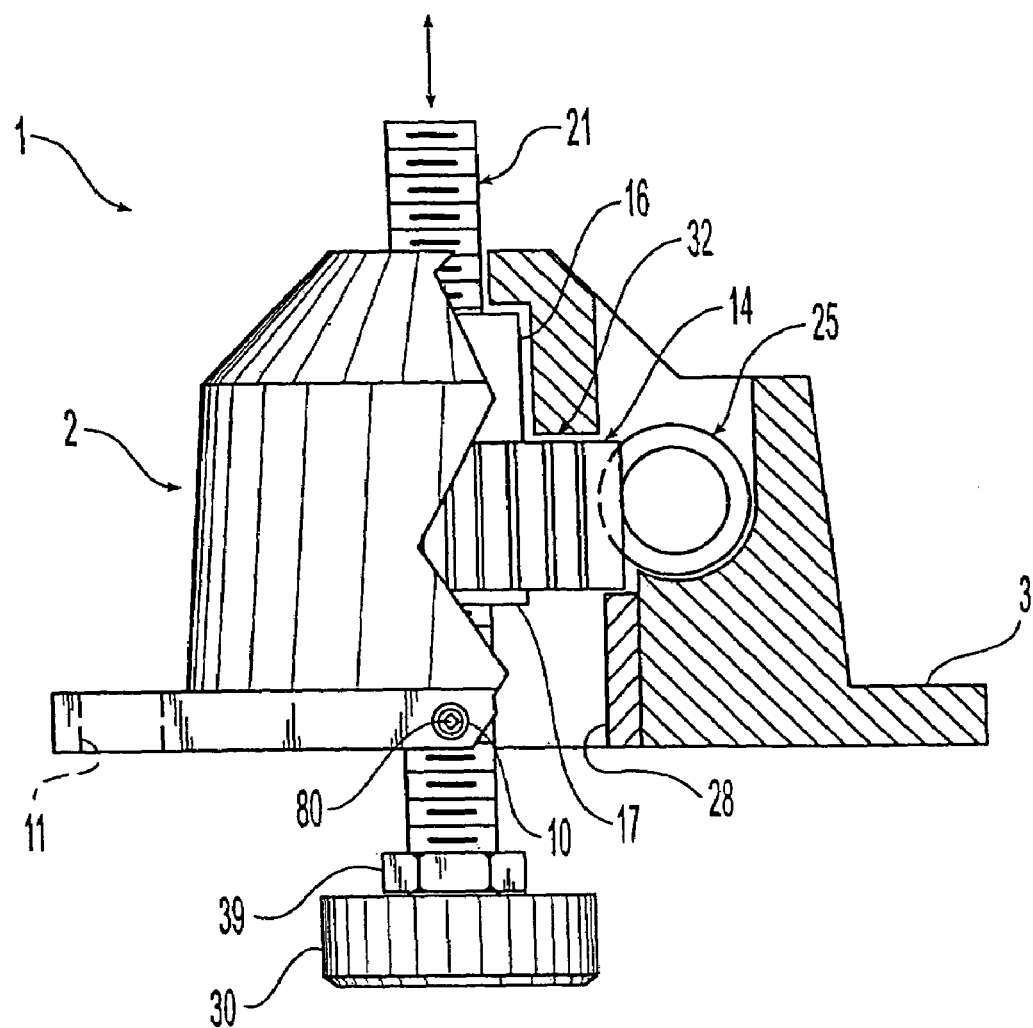
FIG. 1B is a side view of the leveling device of FIG. 1A which has a pad disposed on one end of the elevation shaft and is shown with the housing and collar partially cut away to reveal the elevation shaft, driven gear, and worm gear.

It should be noted that the leveling device 1 of the invention does not require any separate load-carrying bearings, which are noticeably absent in FIG. 1B. The absence of separate bearings allows for design simplicity, flexibility in the selection of materials for components, and a leveling device 1 which is easy and economical to manufacture.

The components and operation of the leveling device 1 are described in greater detail hereafter by reference to the drawings. A detailed description of the housing 2 will be provided first, followed by discussion of the remaining components of the leveling device 1.

Figure 2A:
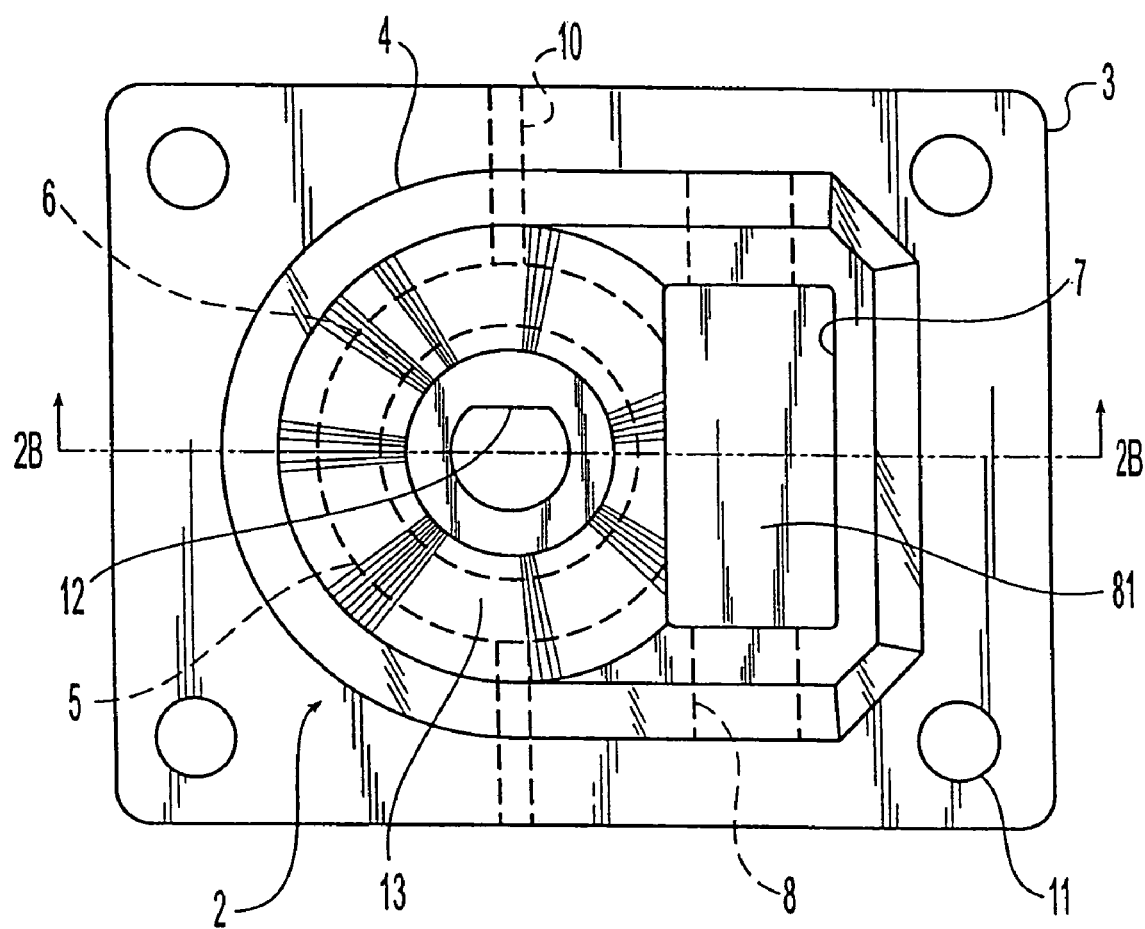
FIG. 2A is a top plan view of the housing of the leveling device of FIG. 1A.

Referring now to FIGS. 2A & B, the housing 2 may have a base portion 3, a top portion 13, and a substantially hollow portion 4. The housing 2 may be made from any suitable material that possesses sufficient structural strength to withstand any static and dynamic loads that may imposed on the leveling device 1 by the object to which it is attached.

Preferably, the housing is made of a commercially available plastic of suitable strength such as, but not limited to, polycarbonate, polyvinyl chloride, etc. However, the housing 2 may also be made from metal, fiberglass, etc. It will be appreciated that material selection for the housing 2 is a matter of design choice and economics, and therefore the housing material is expressly not limited to the preferred embodiment disclosed herein.

The housing 2 may be a one-piece construction which is cast or molded in a single piece, machined from a single piece of material stock, or fabricated by any other suitable manner commonly known in the art. Alternatively, the housing 2 may made of two or more pieces that are joined together either in a permanent type of assembly (e.g., welded or soldered metal connections, glued or heat fused plastic connections, riveted or pinned connections, etc.) or semi-permanent type of assembly (e.g., threaded, screwed, or keyed connections, etc. ) which can be readily disassembled. Of course, a combination of permanent and semi-permanent types of fabrication may also be employed.

Figure 9:
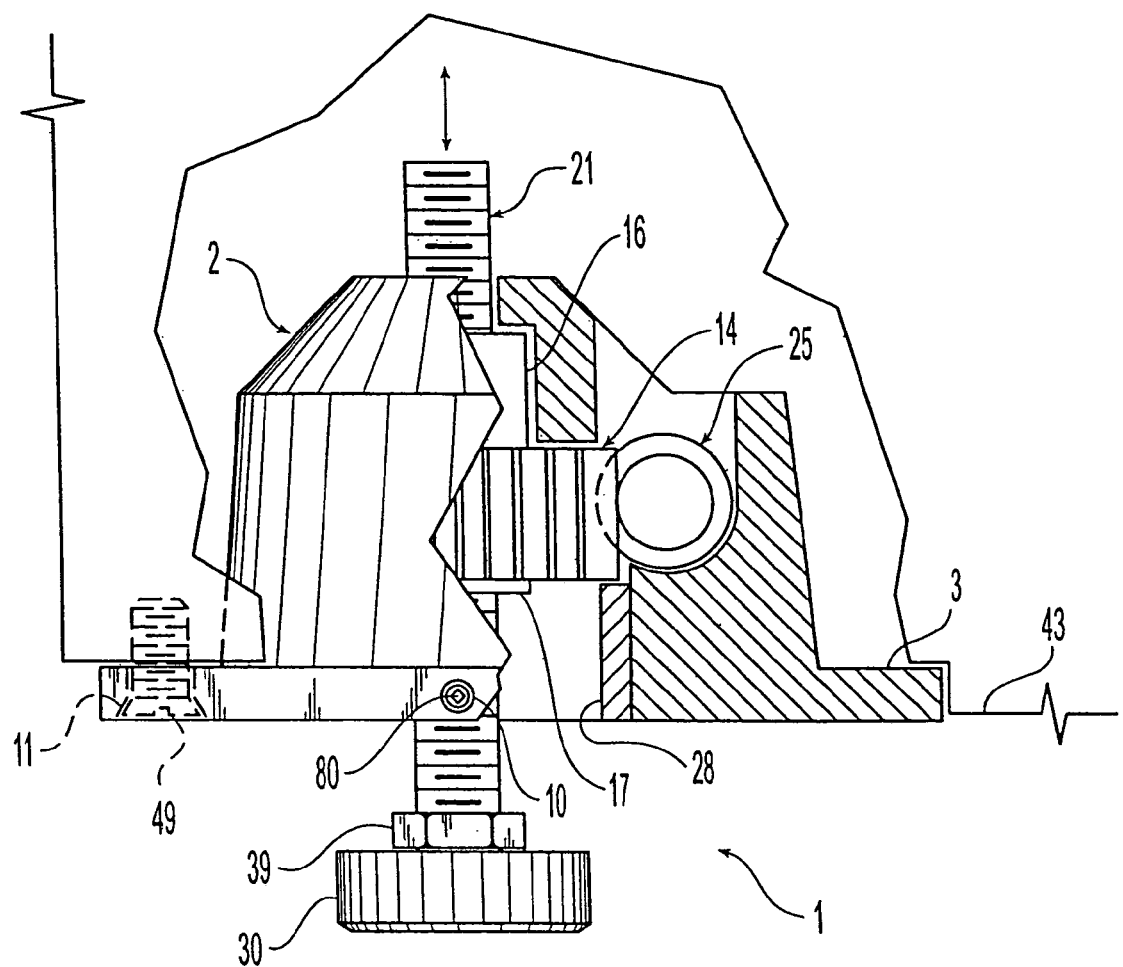
FIG. 9 is a side view of the leveling device of the present invention which has a pad and is shown installed in its normal vertical orientation in an object, wherein the leveling device is further shown with the housing partially cut away to reveal the elevation shaft, driven gear, and worm gear in the housing.
Figure 10:
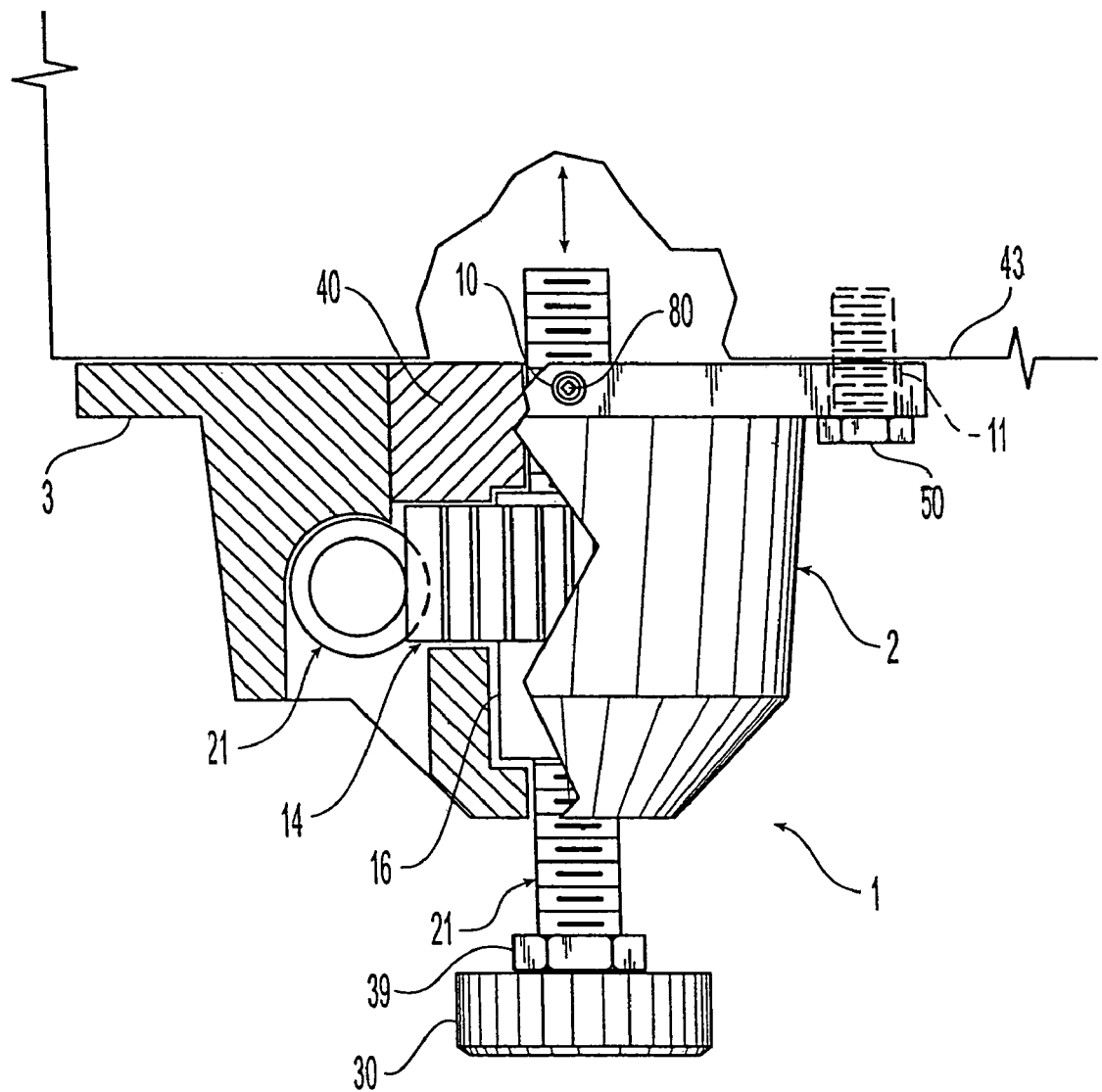
FIG. 10 is a side view of the leveling device of the present invention which has a pad and is shown installed vertically inverted by 180 degrees from its normal vertical orientation in an object, wherein the leveling device is further shown with the housing and load-bearing retaining block partially cut away to reveal the elevation shaft, driven gear, and internal compartments of the housing.

As shown in FIGS. 1A & B, the base portion 3 is a substantially flat, planar surface which is typically attached to the underside of an object. The base portion 3 may be provided with holes 11 as shown (FIG. 2A) for attaching the leveling device 1 to an object. The size, number of holes, and their physical layout on the base portion 3 will be dependent upon the particular intended application, and therefore the base is not limited to the embodiment shown and described. The leveling device 1 may be attached to the object in any conventional manner known in the art and commonly used to attach supports or legs. For example, the leveling device 1 may be attached with threaded fasteners (e.g., bolts, screws, etc.) which are inserted through the holes 11 in the base portion 3 and engage a threaded female socket provided on the bottom of the object cabinet or frame (FIGS. 9 & 10). The method of attaching the leveling device 1 to an object is not limited to the use of holes in the base portion 3 and threaded fasteners. Depending on the material of construction and configuration of the base portion 3 and the object, the leveling device 1 may be attached to an object by riveting, welding, or any other method commonly known in the art which can provide an attachment.

It will be readily appreciated that the configuration, size, and thickness of the base portion 3 is strictly a matter of design choice, and is dependent upon the intended application and the configuration of the object to which the base portion 3 will be attached. Accordingly, the base portion 3 is not limited to the embodiment shown in FIGS. 2A & B.

Figure 2B:
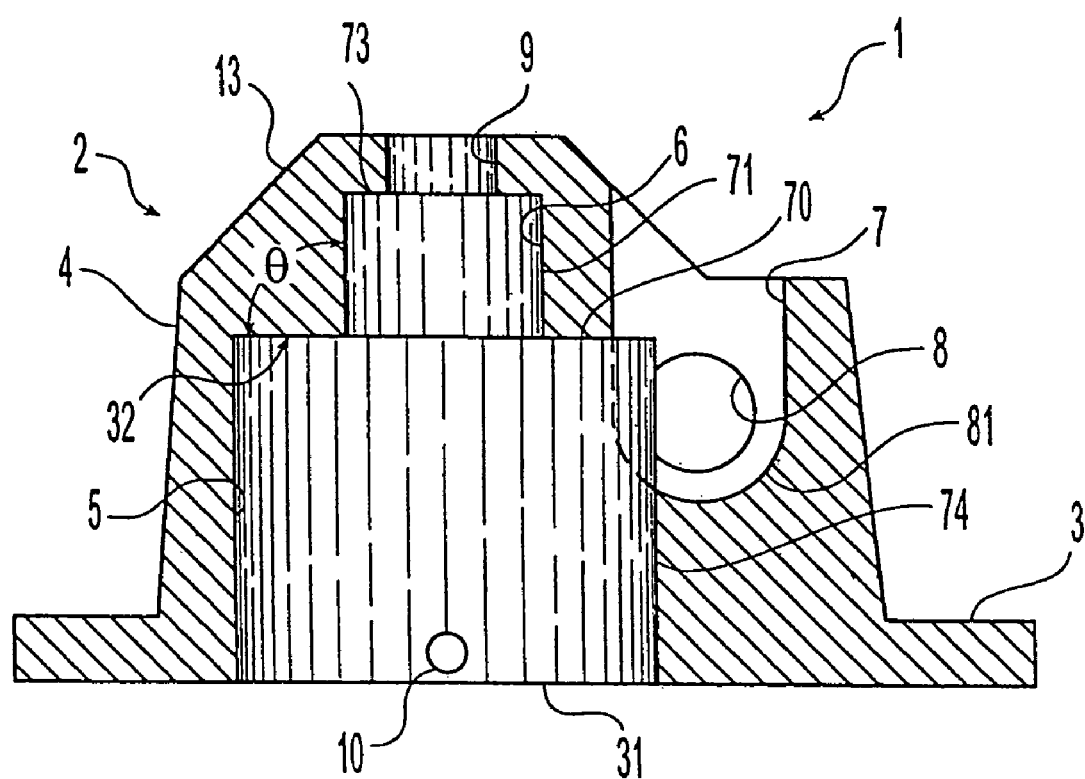
FIG. 2B is a cross-sectional view of the housing of the leveling device of FIG. 2A taken through line 2B-2B in FIG. 2A.

As shown in FIG. 2B, the substantially hollow portion 4 of the housing 2 comprises one or more interconnected internal chambers or compartments which may be coaxially aligned and different in size. In one embodiment, a first internal compartment 5 and a second internal compartment 6 are provided in which the compartments have different cross-sectional areas when viewed from the base portion 3. Preferably, compartments 5 and 6 have circular cross-sections (best seen in FIG. 2A) with the cross-section of compartment 5 being larger than that of compartment 6. This arrangement may be used where a driven gear 14 with a single stem 16 (FIG. 3A) is used in the leveling device 1. In this case, the driven gear 14 would occupy a portion of the space of the first compartment 5, while the stem 16 would occupy the second compartment 6 (see FIG. 1B).

The configuration and size of compartments 5 and 6 are adapted to correspond with the configuration and size of the driven gear 14 and its stem 16, respectively. The first compartment 5 has a side wall 74 and an upper horizontal surface 70. Similarly, the second compartment 6 has a side wall 71 and an upper horizontal surface 73. The side wall 71 of the second compartment 6 intersects the upper surface 70 of the first compartment 5 at an angle θ as shown in FIG. 2B, thereby allowing both compartments 5 & 6 to be in physical communication with one another. Preferably, the angle θ is 90 degrees; however, any angle may be used which is a matter of design choice and dependent upon the configuration of the driven gear 14 and any stems 16 (see FIGS. 3A-E) which may be located in the housing 2.

With continuing reference to FIG. 2B, the upper surface 70 of the first compartment 5 and side wall 71 of the second compartment define a stepped transition 32 which is formed between the first compartment 5 and second compartment 6. The stepped transition 32 provides horizontal and vertical load-bearing surfaces which function in concert with the driven gear 14 and/or any stems 16 (see FIGS. 3A-E) to resist the static and dynamic loads which may be imposed on the leveling device 1 by an object to which the leveling device is attached. The upper surface 73 of the second compartment 6 may also be designed to provide a load-bearing surface which functions in concert with the stem 16 of the driven gear 14 (see, e.g., FIGS. 3A-E) to resist static and dynamic vertical loads imposed on the leveling device 1.

It should be noted that the invention is not limited to a housing 2 containing two internal compartments as shown in FIGS. 2A & B. Indeed, any number, shape, or arrangement of compartments is possible which is a matter of design choice and dependent upon the intended application of the leveling device 1. For example, a single internal compartment may be used where a driven gear 14 without a stem (not shown) is used in the leveling device 1. Alternatively, the housing 2 may have more than two compartments depending on the arrangement and number of internal gearing assembly components used in the leveling device 1. It should further be noted, as previously mentioned, that the housing and consequently also its internal compartment(s) may be formed as either an integral part of the housing 2, or by any number of separate pieces or components which may be assembled in either a permanent or semi-permanent type fashion.

As shown in FIG. 2B, a hole 31 is provided in the base portion 3 which opens into the first compartment 5 from below, and which is preferably the same diameter as the first compartment 5. The hole 31 allows the driven gear 14 to be inserted in the hollow portion 4, and further provides a space in one embodiment of the invention wherein the pad 30 may be completely withdrawn into the housing 2 (FIG. 1B).

The top portion 13 of housing 2 has at least one hole 9 disposed therein which is contiguous and axially aligned with the second compartment 6 and which penetrates the upper surface 73 of the second compartment 6 as shown in FIG. 2B. Hole 9 provides the capability to allow the elevation shaft 21 to pass through the top portion 13 of the housing 2. As best shown in FIG. 2A, the hole 9 may be provided with a flat surface 12 to prevent the elevation shaft 21 from rotating when it slides through the hole. This causes the internal threads of the driven gear 14 (FIGS. 3A-E) to engage the threads on the elevation shaft 21 (FIG. 5A), thereby imparting an axial up or down movement to the shaft as described in additional detail below.

It will be appreciated that the external shape or geometry of housing 2 is a matter of design choice and discretionary being based upon a number of factors including the intended application, manufacturing considerations for the housing, the configuration of the object to which the leveling device 1 will be attached, etc. Accordingly, the leveling device 1 is not limited to the shape of the housing described herein. For example, although the exterior geometry of the housing 2 of shown in FIGS. 2A & B is depicted with partially rounded sides and a truncated conical top, a square or rectangular shaped exterior, for example, may also be used for the housing.

With continuing reference to FIGS. 2A & B, a substantially rectangular shaped well or cavity 7 may be provided in the housing 2 for the worm gear 25 (FIG. 4A). The worm gear cavity 7 may have an open top which allows access to the worm gear from the top portion 13 of the housing 2. The bottom half 81 of the cavity 7 may have a semi-circular cross section to match the shape and size of the worm gear 25. Importantly, the cavity 7 opens into and is contiguous with the first internal compartment 5 wherein the driven gear 14 (FIG. 3A) is housed. This allows the teeth 27 of the worm gear 25 to contact and mesh with the teeth 15 of the driven gear 14 when both components are inserted in their respective positions within the housing 2. It will be readily appreciated that the size and configuration of the worm gear cavity 7 is a matter of design choice and there are numerous possible designs for such a cavity. Accordingly, the design of the worm gear cavity 7 is not limited to the size and configuration shown.

The housing 2 may have one or two holes 8 that extend from the outside through the housing into the worm gear cavity 7 (FIGS. 2A & 2B). The purpose of the hole(s) 8 is two-fold. First, the hole(s) 8 allow an extension to be provided for one or both ends of the shaft 26 of the worm gear 25 (FIG. 4A) which protrude out beyond the housing 2 so that the worm gear may be turned by applying an external rotational force to the shaft. Second, the hole(s) 8 serves to support the ends of the worm gear 25. The hole(s) 8 may be provided with a metal shoulder bushing 82 as shown in FIG. 1A; however, no bushing need be provided and a plain hole(s) may be used.

FIGS. 3A-E depict several embodiments the driven gear 14 which may be used and is engaged by the worm gear 25 to raise and lower the elevation shaft 21 of the leveling device 1 (see FIG. 1B). The driven gear 14 may have an upper flat surface 62 and lower flat surface 63. The driven gear 14 may be any type of gear which is capable of being engaged by worm gear 25. Preferably, the driven gear 14 is a spur gear as shown and which is readily recognizable by its teeth 15 which are located on the side of the gear and oriented in a straight pattern perpendicular to the two flat surfaces 62 and 63 of the gear. However, the invention is expressly not limited to the use of spur gears, and as mentioned above, any other type of suitable gear such as a helical gear (in which the teeth are oriented at an angle to the flat surfaces of the gear) may also be used. In contrast to some of these other types of gears with more complex teeth patterns, spur gears are simple in design and hence very economical to produce. Furthermore, since a spur gear has a straight tooth pattern, the spur gear may be used with a worm gear 25 having either left or right-handed threads. The practical and economic advantages of this flexibility will be evident upon further discussion of the leveling device 1 below.

Figure 3A:
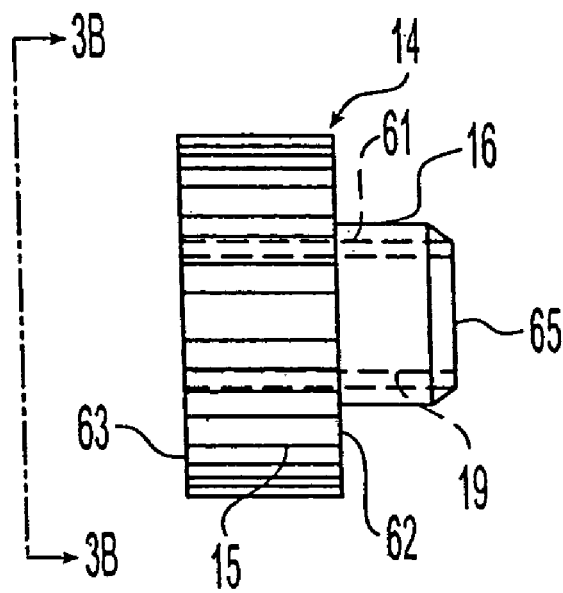
FIG. 3A is a side view of the driven gear of the leveling device of FIGS. 1A, 1B, or 1C which has a single stem.
Figure 3B:
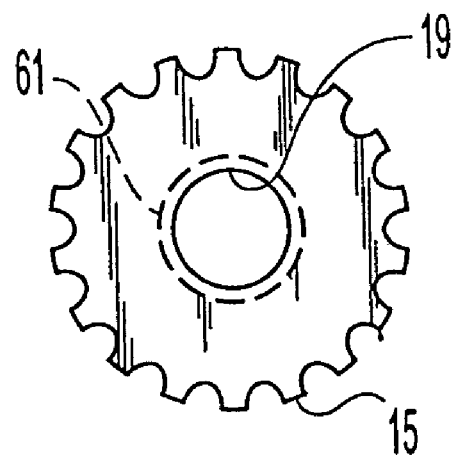
FIG. 3B is an end view of the driven gear of FIG. 3A of the leveling device of FIGS. 1A, 1B, or 1C viewed from the end opposite the single stem.
Figure 3C:
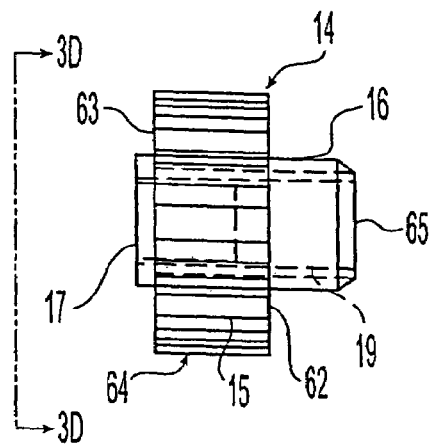
FIG. 3C is a side view of another embodiment of the driven gear of the leveling device of FIGS. 1A, 1B, or 1C which has a bushing which may be used with the invention.
Figure 3D:
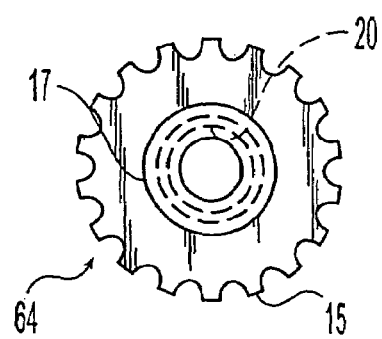
FIG. 3D is an end view of the driven gear of FIG. 3C of the leveling device of FIGS. 1A, 1B, or 1C viewed from the end opposite the single stem.
Figure 3E:
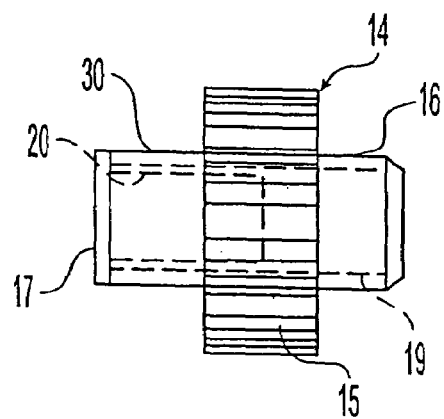
FIG. 3E is a side view of another embodiment of the driven gear of the leveling device of FIGS. 1A, 1B, or 1C which has two stems and a bushing which may be used with the invention.

The driven gear 14 may contain a stem 16 as shown in FIGS. 3A-D which protrudes or extends outward from the upper flat surface 62 of the gear. Optionally, in another embodiment shown in FIG. 3E, a second stem 30 may also be provided which protrudes from the lower surface 63 of the gear as shown in FIG. 3C. However, it should be noted that a driven gear 14 may also be used which does not have any stems. Preferably, the driven gear 14 has a single stem 16. Accordingly, it will be appreciated that the presence and number of stems, if any, is a matter of design choice and the number, as well as whether the driven gear 14 has any stem is not limited to the embodiments described herein.

Although the intersection between the upper flat surface 62 of the driven gear 14 and stem 16 is shown in FIGS. 3A, C, & E to be at a 90 degree angle, a bevel (e.g., 45 degrees—not shown) may also be used between these two structures to reduce the stress concentration at the intersection. In that embodiment, the stepped transition 32 between the first and second internal compartments 5 & 6, respectively, would be cooperatively configured to accommodate the bevel (not shown).

The driven gear 14, and stems 16 and 30 if they are used, are preferably all made of plastic. However, any suitable material may be used including metals such as stainless steel for example.

As shown in FIGS. 3A & B, an opening 19 is disposed in the driven gear 14 which runs completely through the centerline of the gear and any stem(s) if provided. The opening 19 forms a passageway configured and adapted to receive the elevation shaft 21 and allows the shaft to move back and forth through the driven gear 14. Threads 61 are provided within the opening 19 which are designed to operably engage the threads 60 on the elevation shaft 21 (FIG. 5A).

Where the elevation shaft 21 is made of metal and the driven gear 14 is made of plastic, there would be a possibility of stripping threads on the plastic driven gear if opening 19 were directly threaded to receive the elevation shaft. This situation may be avoided by the embodiment shown in FIGS. 3C-E wherein a metal bushing 17 containing internal threads 20 is preferably inserted into and preferably fixedly attached in opening 19. The bushing threads 20 engage the threads on the metal elevation shaft 21. Since both the bushing 17 and elevation shaft 21 are made of the same material, preferably having comparable mechanical strength properties, stripping of the threads on either component is prevented. Preferably, the bushing 17 and elevation shaft 21 are both made of plated or unplated metal, more preferably stainless steel.

It will be appreciated as described above in conjunction with FIGS. 3A & B that if the elevation shaft 21 and driven gear 14 are both made of plastic (having comparable mechanical strength properties), no threaded metal bushing 17 is necessary and the opening 19 may be threaded directly to receive the elevation shaft 21 without concern for stripping threads on either component.

The bushing 17 may be inserted directly into the driven gear 14 opposite the stem 16 as depicted in FIGS. 3A-D where only a single stem is used or where no stem is used at all (not shown). Alternatively, the bushing 17 may be inserted into the stem. This latter arrangement is necessary where two stems are provided with the driven gear 14 (see, e.g., FIG. 3E). Preferably, the bushing 17 is held in place by press fitting the bushing into the driven gear 14, or stems 16 or 17, depending upon the gear and stem configuration selected and the discretion of the designer. However, the bushing 17 may alternatively be held in place by any other suitable means commonly known in the art (e.g., adhesives, etc.) which is capable of providing a rigid attachment such that there is no relative rotation between the bushing and the driven gear 14.

As best understood with reference to FIGS. 1B & 2B, the preferred embodiment uses a driven gear 14 with a single stem 16 inserted in the substantially hollow portion 4 of the leveling device 1. The driven gear 14 is positioned in first compartment 5 while the stem 16 is positioned in the smaller second compartment 6. The diameter of the first compartment 5 is fabricated and sized such that it is only slightly larger than the outside diameter of the driven gear 14. Preferably, the resulting gap between the first compartment 5 and the driven gear 14 diameters should not be so large such that there is a loose or sloppy fit of the driven gear 14 in the housing 2, while at the same time the gap should not be so small such that the driven gear 14 cannot freely rotate without binding with the adjacent first compartment 5 side walls. The proper gap can readily be determined and produced by one skilled in the art based upon the materials selected for the components and methods of fabrication employed which will determine the concomitant manufacturing tolerances. Preferably, the gap between the diameters of the second compartment 6 and the stem 16 should be sized similarly.

The worm gear 25 as shown in FIGS. 1A & B is disposed in cavity 7 of the housing 2. With reference to FIGS. 4A-C, the worm gear 25 comprises a shaft 26 and external threads 27 which are adapted and configured to engage the teeth 15 of the driven gear 14 (FIG. 3B). A socket 34 may be provided in each end of the shaft 26 which is configured to receive an extension rod 36 (see also FIG. 1A) that may be of any length desired and is sized to fit through the holes 8 (FIGS. 1A & 2A) of the housing 2 at each end of the worm gear cavity 7. When turned by a tool as described below, the extension rod 36 operably engages and rotates the worm gear 25 to operate the leveling device 1. Since the extension rods 36 also support and maintain alignment of each end of the worm gear 25 within the housing 2 when the rods are installed through the holes 8, the leveling device 1 preferably has an extension rod inserted in each socket 34. Preferably, at least one extension rod 36 of each leveling device 1 has a length sufficient to reach the front of an object (e.g., appliance, equipment, etc.) to be leveled where it is readily accessible by an installer. Thus, the extension rods 36 allow the installer to remotely access and rotate the worm gear 25 in order to operate the leveling device 1. This is advantageous when the leveling device 1 is installed in the rear of the object and would otherwise not be reachable without the extension rod 36. The front of the extension rod may be supported by a bracket 51 (FIG. 11) or other suitable means that may be provided as part of the object 43.

It should be recognized that where the leveling device 1 is readily accessible without the use of a long extension rod 36 routed to the front of the object, short extension rods may alternatively be used. Accordingly, the extension rods 36 can be made whatever length is necessary to allow the leveling device 1 to be operated and will be dependent upon the particular design and installation requirements encountered.

The insertion end 37 of the extension rod 36 which is inserted into the socket 34 is configured to match the shape and size of the socket in the end of the worm gear 25. The socket 34 is of a sufficient depth to securely seat the extension rod in the worm gear 25. In FIGS. 4A & B, the preferred embodiment of the socket 34 and insertion end 37 are configured to be square in shape. However, any shape of socket 34 and insertion end 37 may be used. It will be appreciated that numerous ways can be envisioned to operably couple the extension rods 36 to the worm gear 25. For example, in one alternative embodiment rectangular projections or ears (not shown) may be attached to the insertion end 37 by any suitable means commonly known in the art and which are configured to securely fit into the square socket 34 shown in FIG. 4B. In another embodiment, an axially-aligned open passageway (not shown) may be provided through the entire length of the worm gear 25 which is adapted and configured to receive a single extension rod 36. The passageway would extend completely through the worm gear 25 from end to end such that the extension rod 36 would protrude from each end of the gear 25. As an example, the passageway may have a square cross-section like that shown in FIG. 4B for socket 34 (but extending completely through the worm gear 25) and at least the portion of the extension rod 36 that runs through the worm gear may also have a correspondingly shaped square cross-section to operably engage the gear. Such a design maximizes the contact surface between the worm gear 25 and extension rod 36, thereby enhancing the strength of the coupling between the two components.

Referring now to FIG. 4C, the extension rod 36 has a tooling end 38 located opposite the insertion end 37. Preferably, the tooling end 38 is in the shape of a hex head; however, any shape may be used. An installer can conveniently operate the leveling device 1 by using a tool (e.g., crescent wrench, socket wrench, electric or air drill with socket, etc.) to engage the tooling end 38 and rotate the extension rod 36 and worm gear 25, thereby imparting leveling motions to an object attached to the leveling device. Although manual operation of the leveling device 1 by an installer has been discussed, the extension rod 36 may also be turned by an electric motor that may be provided with the object 43. It should also be recognized that the extension rod 36 need not extend all the way to the front of the object 43. A short extension rod 36 may alternatively be used which can be reached from the front of the object by a manual or power tool having a sufficiently long length. Preferably, however, the extension rod 36 reaches the front of the object 43.

It should be noted that the design of the gearing for the leveling device 1 of the invention (i.e., gear ratio, pitch, pressure angle, contact ratio, teeth shape and size, etc.) is well within the ambit of knowledge of those skilled in the art and will not be expounded upon herein for the sake of brevity.

The elevation shaft 21 in one embodiment as shown in FIG. 5A may comprise a threaded rod. Although only portions of the shaft 21 are shown as having threads 60 in FIG. 5A (for clarity sake only), the extent of the shaft that is to be threaded can be varied. Indeed, the entire length of the shaft 21 may be threaded. The extent and location of threads provided is a matter of design choice and will be determined by ensuring the threading is sufficient to operably engage the driven gear throughout the shaft's 21 expected range of axial movement. It will be recalled that the threaded elevation shaft 21 engages internal threads 61 that may be provided in the opening 19 of the driven gear, or internal threads 20 that may be provided in the metal bushing 17 fitted to the driven gear in an alternate embodiment (see FIGS. 3A-E).

Preferably, the shaft 21 is made of plated or unplated metal, more preferably stainless steel. However, material selection for the shaft 21 is a matter of design choice and not limited to the preferred embodiments. Thus, for example, a plastic elevation shaft may also be used dependent upon the design considerations involved for a particular application.

As shown in FIGS. 5A & C, a flat area 24 is provided on the elevation shaft 21 which mates with the flat surface 12 provided in hole 9 in the top portion 13 of the housing 2 (FIG. 2A) to prevent the shaft from rotating as it is raised and lowered through the hole by rotations of the driven gear 14. If the top portion 13 of the housing 2 is made of plastic and the elevation shaft 21 is metal, the face of the flat surface 12 in hole 9 may be fitted with a metal insert 44 to protect the surface 12 from being damaged by the corresponding flat area 24 on the elevation shaft (see FIG. 1A). Although the insert 44 is shown to be generally U-shaped and preferably comprised of sheet metal, any type of insert and manner of attaching it to the flat surface 12 may be used as will be commonly known in the art.

Figure 1C:
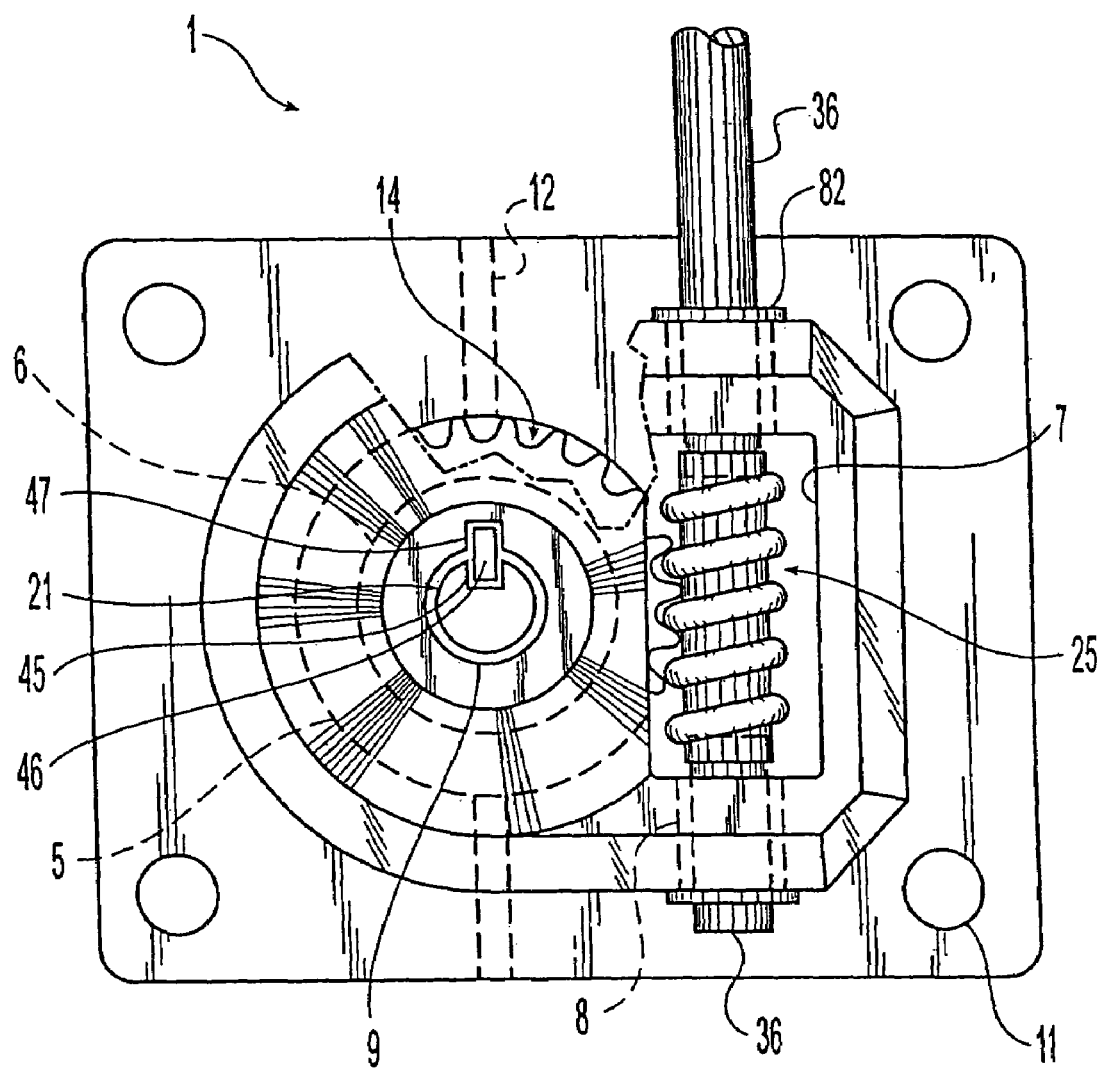
FIG. 1C is a top plan view of another embodiment of the leveling device of the present invention in which the worm gear is visible and further shown with the housing partially cut away to reveal the driven gear.
Figure 1D:
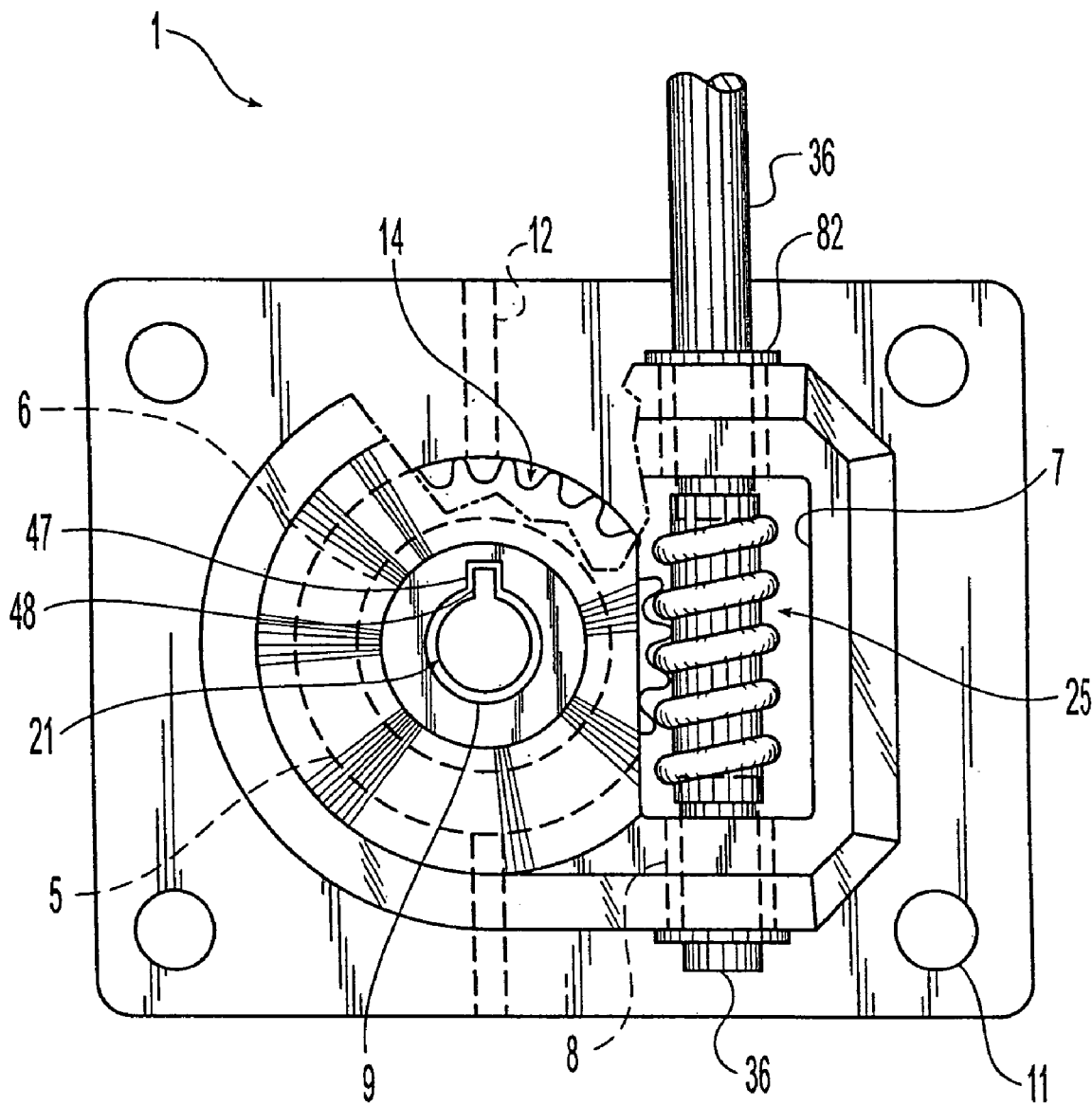
FIG. 1D is a top plan view of another embodiment of the leveling device of the present invention in which the worm gear is visible and further shown with the housing partially cut away to reveal the driven gear.

It should be recognized that there are numerous ways which can be used to prevent the elevation shaft 21 from rotating in the housing 2, and the invention is not limited to the technique just described. For example, a keyed arrangement between the shaft 21 and housing 2 may also be used. In one embodiment, the elevation shaft 21 may be provided with a slot 45 (FIG. 5D) extending along a portion of the longitudinal axis of the shaft. The hole 9 may be configured and provided with a key 46 which mates with the slot 45 in the shaft 21 (FIG. 1C). The key 46 may be a separate component, preferably made of metal, which fits in a slot 47 in the opening 9 in the top portion 13 of the housing 2 (FIG. 1C) and is attached thereto by any means commonly known in the art (e.g., set screw). Alternatively, the key may be formed as an integral part of the housing itself (not shown) in which case the slot 47 in the housing 2 is not required. In another embodiment, the shaft 21 may have a key 48 (FIG. 5E) extending along a portion of its longitudinal axis which fits in slot 47 in the opening 9 of the housing 2 (FIG. 1D), thereby preventing the shaft from rotating. Numerous variations of the keyed arrangement are possible and the means for preventing the shaft 21 from rotating is not limited to the embodiments described herein.

Figure 8:
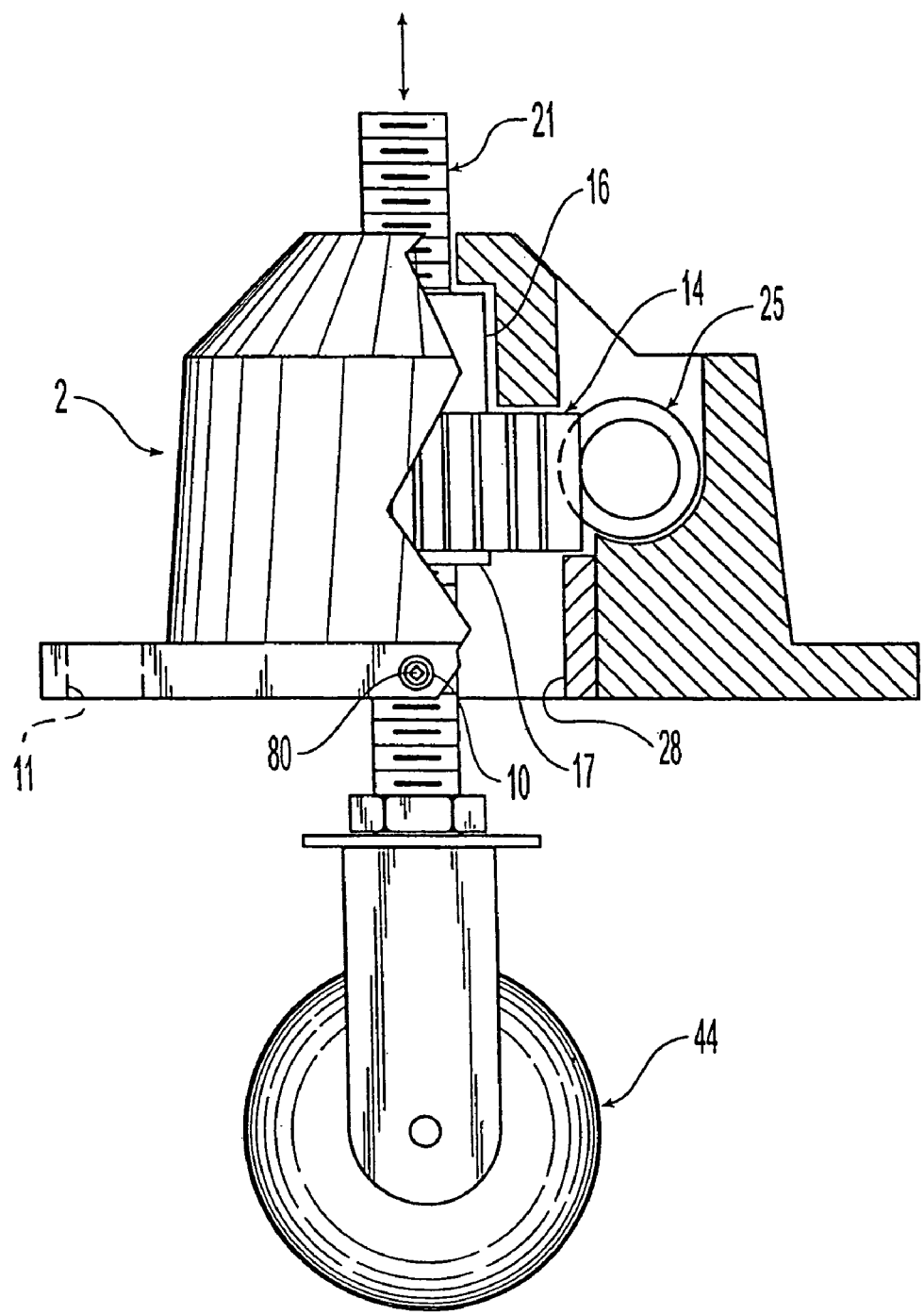
FIG. 8 is a side view of another embodiment of the leveling device of the present invention which has a roller disposed at the end of the elevation shaft, and is shown with the housing and collar partially cut away to reveal the elevation shaft, driven gear, and worm gear in the housing.

One end of the elevation shaft 21 may be configured to accept a pad 30 (FIG. 1B), roller 44 (FIG. 8), or any other similar means to protect a flooring surface which the elevation shaft 21 would contact when the leveling device 1 is in use. It is common practice to provide a surface protector of some sort on the supports or legs of an object (such as an appliance or office machine, for example) to prevent scratching or marring the finish of flooring surface. Preferably, a surface protector of some type is disposed on elevation shaft 21, more preferably a substantially round flat structure or disk such as a pad 30 shown in FIG. 1B is used. The pad 30 may be a commercially-available base used for levelers or glides which may be obtained in a multitude of shapes, sizes, and load-bearing capacities. The pad 30 may be made of any suitable material for the intended application such as plastic, metal, or a combination thereof, and may further include a non-slip material such as rubber disposed on the underside surface of the pad which contacts the floor. Although a round pad 30 is preferred, the pad may be any shape such as square, octagonal, etc.

In one embodiment shown in FIG. 5A, the end of the shaft 21 is configured with a concave head 22 and hex-shaped flange 39 to form part of a ball and socket type swivel joint for the pad 30. The concave head 22 mates with a convex socket (not shown) provided in the pad 30. An axially aligned threaded recess 23 is shown which extends completely through the head 22 and flange 39, and partially into the elevation shaft 21. The recess 23 is intended to receive a threaded fastener (not shown) which may be used to secure the pad 30 to the shaft 21. The hex flange 39 allows a tool to be applied for holding the shaft 21 while installing the pad 30. As is typical with swivel glides, the pad 30 is designed to freely rotate relative to the shaft 21. In addition, the pad 30 swivels or tilts at an angle relative to a plane perpendicular to the longitudinal axis of the shaft 21 to compensate for irregularities in flooring surfaces. Preferably, the pad 30 tilts at angle from 0 to about 5 degrees; however, other ranges of angular movement may be used as a matter of design choice and the invention is not limited in this regard. Although a swivel type arrangement is preferred, a non-swiveling pad 30 may also be used.

It will be appreciated that there are numerous possible ways of connecting a surface protector to the elevation shaft 21, the matter being strictly one of design choice. For example, some commercially available swivel glides have pads 30 that include a ball and socket with a female threaded hex coupling, thereby only requiring the elevation shaft 21 to have a simple threaded end that is screwed into the pad. Accordingly, the end configuration of the elevation shaft 21 is not limited to the embodiments described herein. Moreover, although a surface protecting means is preferably disposed on the end of the elevation shaft 21, it is not necessary for the proper functioning of the leveling device 1 and may be omitted entirely.

Figure 6B:
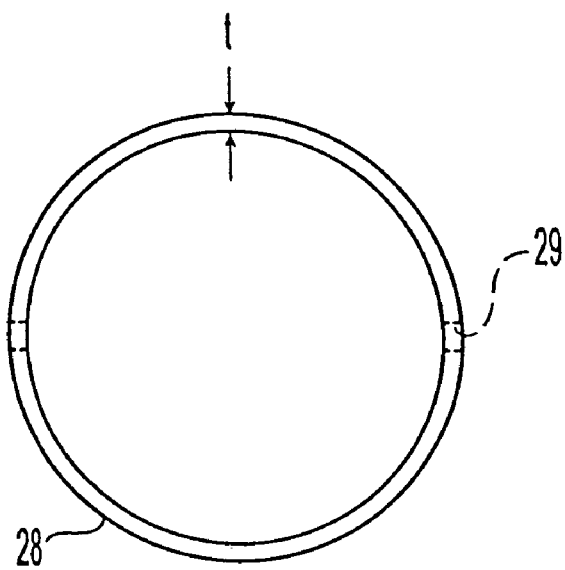
FIG. 6B is an end view of the driven gear retaining collar of FIG. 6A of the leveling device of FIGS. 1A, 1B, or 1C.
Figure 6A:
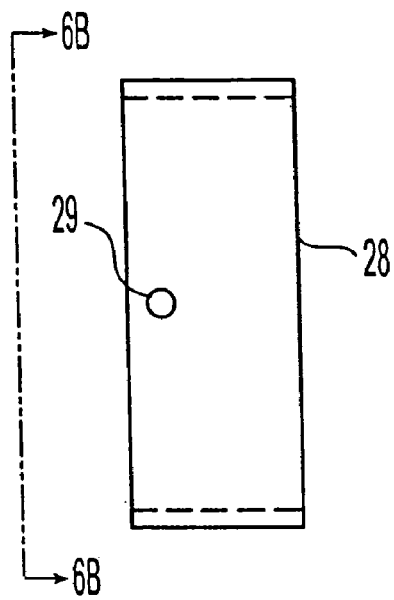
FIG. 6A is side view of the driven gear retaining collar of the leveling device of FIGS. 1A, 1B, or 1C.

The retaining collar 28 which may be used to hold the driven gear 14 in the housing 2 is shown in FIGS. 6A & B. Preferably, the collar 28 is circular in shape with at least one hole 29 disposed therein that may be used to affix the collar to the housing 2. Preferably, two holes 29 are used and the holes are threaded. The holes 29 align with holes 10 (FIGS. 2A & B) also preferably threaded and provided in the housing 2. Set screws 80 (FIG. 1B) or similar means may be used to secure the collar 28 in the housing 2. The thickness "t" of the collar need only be large enough so that the inside diameter of the collar is slightly smaller than the outside diameter of the driven gear 14, thereby preventing the driven gear from falling out of the housing 2. It should be noted that when the leveling device 1 is installed in an object as shown in FIGS. 1B and 9 which shall be referred to herein as the "normal" vertical orientation or position, the collar 28 does not bear any of the weight of the object and only serves to hold the driven gear in the housing. Therefore, the collar 28 need not have high structural strength or rigidity when used in this manner.

In one embodiment, the inside diameter of the retaining collar 28 and the outside diameter of the pad 30 are each cooperatively sized such that the pad may be completely withdrawn into the housing 2 of the leveling device 1 (see FIG. 1B, directional arrows above shaft 21). This can be advantageous when shipping and installing an object to which the leveling device 1 is attached, such as an appliance for example. The appliance, with pads 30 completely retracted into the housing 2, can be shipped and moved into its final installation position before the elevation shaft 21 and pads 30 are deployed. This eliminates the risk of potentially damaging the elevation shaft 21 and pad 30 while the appliance is in transit or being installed. Morever, depending on the amount that the base portion 3 is allowed to project from the underside of the object 43 as shown in FIG. 9, the leveling device 1 (with the pad 30 retracted into the housing 2) may be used as a slide to facilitate pushing the object into its final position. Also, if the base portion 3 is made of plastic, the flooring surface is protected against scratching and marring when the object is slid into position.

Figure 7B:
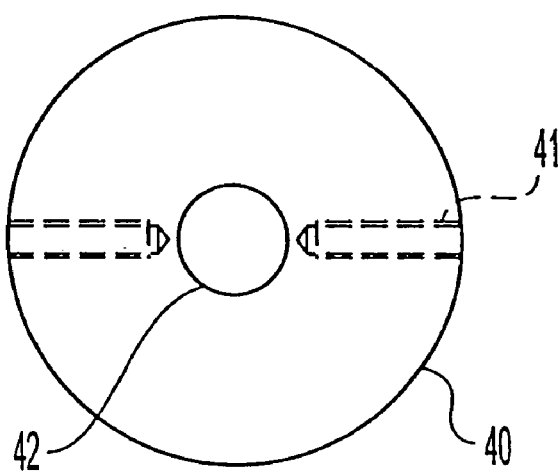
FIG. 7B is an end view of the load-bearing driven gear retainer of FIG. 7A of the leveling device of FIGS. 1A, 1B, or 1C which may be used in lieu of a collar when the leveling device is installed vertically inverted by 180 degrees.
Figure 7A:
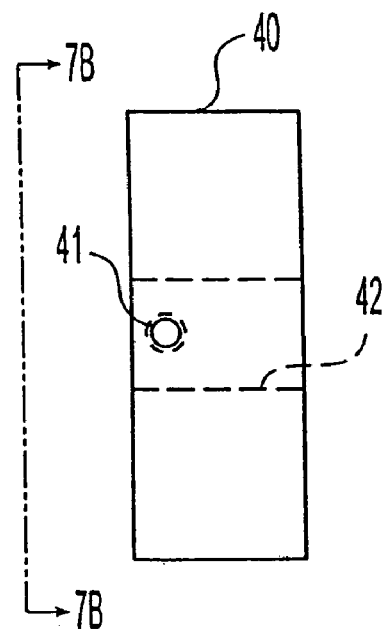
FIG. 7A is a side view of a load-bearing driven gear retainer of the leveling device of FIGS. 1A, 1B, or 1C which may be used in lieu of a collar when the leveling device is installed vertically inverted by 180 degrees.

If the leveling device 1 is installed on the bottom of an object in what shall be referred to as the "inverted" vertical position (FIG. 10), whereby the device is vertically inverted 180 degrees from the normal vertical orientation, the retaining collar 28 would be subjected to loads imposed by the weight of the object (described in detail below). In this case, a load-bearing retainer with greater structural strength and a stronger method of attaching it to the housing 2 would be required than with the collar 28 shown in FIGS. 6A & B. Accordingly, a load-bearing driven gear retainer 40 as shown in FIGS. 7A & B may be used in lieu of the collar 28. Preferably, the load-bearing retainer 40 is a round, flattened structure, such as a solid circular disk, with a hole 42 disposed therein which is adapted and configured to receive the elevation shaft 21. The load bearing retainer 40 is not limited to this preferred embodiment and any other suitable structure with load-bearing capacity may be used for the retainer 40. The load-bearing retainer 40 may be attached to the housing 2 of the leveling device 1 with set screws 80 like the collar 28 as described above. However, the number of set screws 80 and/or their size may be increased to provide a stronger means of attaching the retainer 40 to the housing 2 as will be readily determinable using design and fabrication practices commonly known in the art. Alternatively, any other suitable means may be used to attach the retainer 40 to the housing 2 and the invention is not limited to the use of set screws 80. For example, a threaded coupling could be used between the retainer 40 and housing 2 by providing external threads on the outer surface of the retainer 40 and internal threads in the hollow portion 4 and base portion hole 31 of the housing (FIG. 2A).

It is important to recognize that the load-bearing retainer 40 need not be designed to solely withstand the loads imposed on the leveling device 1 by the weight of the object to which it is attached. It will be recalled that when the leveling device 1 is installed in the "inverted" vertical orientation and a load-bearing retainer 40 is used, the retainer actually lies next to the underside of object. Advantageously, the bottom frame or cabinet of the object, which by way of example may be a copying machine, large frame computer, or other business machine, can be designed to bear the majority of the weight load imposed by the machine. This can be accomplished by ensuring that the load-bearing retainer 40 is braced against the bottom of the machine, thereby transferring the vertical weight load through the retainer to the underside of the machine. Under these circumstances, therefore, the load-bearing retainer 40 need only have sufficient structural strength to transfer the weight load to the machine frame or cabinet. This will be more clearly understood from the following discussion of the loads and forces imposed by an object on the leveling device 1.

The leveling device 1 is capable of handling both static and dynamic loads imposed by the object to which it is attached. As previously mentioned, the stepped transition 32 (defined by the upper horizontal surface 70 of the first internal compartment 5 and side wall 71 of the second internal compartment 6 shown in FIG. 2B) and/or upper horizontal surface 73 function with the driven gear 14 and/or stem 16 (FIGS. 3A-D) to resist static and dynamic loads. The static load comprises the weight of the object which acts in a vertical plane parallel to the force of gravity. Dynamic loads are typically generated by the motion of internal moving parts in the object and/or by external forces imparted to the object. Examples of dynamic load sources caused by internal moving parts are vibrations and forces caused by washing machine agitators, rotating drums in dryers, etc. An example of the dynamic load sources caused by external forces would be a person or equipment bumping into the object. Dynamic loads may act in both a vertical and horizontal plane.

As best explained by reference to FIGS. 2B & 9, the static weight load of the object 43 and any vertical dynamic loads are transferred by the upper horizontal surface 70 of the first compartment 5 to the upper flat surface 62 of the driven gear 14 which preferably contact each other. The driven gear 14 transfers the static load to the elevation shaft 21 via the threaded connection provided between these two components as described above. The static load is finally transferred by the shaft 21 to the floor on which the object 43 rests. Thus, the upper horizontal surface 70 eliminates the need for any separate bearings (e.g., thrust bearings, roller bearings, journal bearings, etc.) to withstand the vertical loads imposed by the object on the leveling device 1.

It should be recognized that the free end 65 (best seen in FIGS. 3A & C) of the driven gear stem 16 may optionally be designed to contact the upper horizontal surface 73 of the second internal compartment 6 in order to transfer part or all of the vertical load (static and dynamic) through the stem to the upper flat surface 62 of the driven gear 14. This load is then transferred to the elevation shaft 21 and floor as described above through the threaded connection between the shaft and driven gear 14. Accordingly, all of the vertical loads may be designed to be transferred only to the stem 16, or the vertical loads may be transferred partially to both the upper horizontal surface 70 of the driven gear 14 and the stem. As explained above, all of the vertical loads may be designed to be transferred to the upper flat surface 62 of the driven gear 14 alone.

With additional reference to FIG. 2B, any horizontal dynamic loads are transferred by the side wall 74 of the first internal compartment 5 to the sides 64 and teeth 15 of the driven gear 14. Alternatively, if a driven gear 14 with one gear stem 16 is used as shown in FIG. 1B, the side wall 71 of the second internal compartment 6 (FIG. 2B) may be designed to make contact with the stem and transfer part or all of the horizontal dynamic loads to the stem. In this case, all of the horizontal dynamic loads may be designed to be transferred only to the stem 16, or the dynamic loads may be transferred partially to both the sides 64 and teeth 15 of the driven gear 14 and the stem. If more than one gear stem 16 is used in the leveling device 1 (FIG. 3E), part or all of the horizontal dynamic loads may also be transferred to the additional gear stem similarly to that just described for a single stem above. As explained above, all of the horizontal loads may be designed to be transferred to the side wall 74 of the first internal compartment 5 alone. Thus, the side walls of the first and second internal compartments 5 and 6, respectively, eliminate the need for any separate bearings (e.g., thrust bearings, roller bearings, journal bearings, etc.) to withstand the horizontal dynamic loads that may be imposed by the object on the leveling device 1.

It will be appreciated that the upper horizontal surface 70 of the first compartment 5 and the upper flat surface 62 of the driven gear 14 should have a reasonably smooth surface finish to allow the driven gear to be rotated without binding under the static weight of the object to which the leveling device 1 is attached. Since it is unlikely that the object will be operated or bumped while it is being leveled, the leveling device 1 need not be designed to allow the driven gear 14 to be rotated under any vertical dynamic loads.

Operation of the leveling device 1 will now be described with general reference to FIGS. 9 & 11. In FIG. 9, the leveling device 1 is shown mounted to the underside of an object 43 in the "normal" vertical orientation with the base portion 3 at the bottom and the top portion 13 at the top. The substantially hollow portion 4 and top portion 13 of the housing project upwards inside the object 43. Although the bottom of the base portion 3 is shown as being mounted substantially flush with the underside of the object 43 (in a depression provided therein which is adapted and configured to mate with the shape of the base portion), the leveling device may also be surface mounted such that the full height of base portion projects completely below the underside of the object (not shown). It will be appreciated that the leveling device 1 may be mounted to the object 43 with any portion of the base portion 3 projecting below the underside of the object, or none at all.

Mounting screw 49 is shown (FIG. 9) which attaches the leveling device 1 to the underside of the object 43 through holes 11 in the base portion 3. Although a countersunk bolt and mating hole are depicted, it will be appreciated that any type or shape of bolt or screw may be used to attach the leveling device 1 to the object 43 which is matter of design choice (see, e.g., FIG. 10 depicting use of hex head bolts). In the installation shown in FIG. 9, countersunk bolts or screws are preferred to avoid scratching or marring the flooring surface while the object 43 is slid into its final position by the installers. It should also be recognized that conventional hex head bolts (FIG. 10) may also be countersunk by providing a shallow depression in base portion 3 surrounding the hole 11 such that the bolt head lies at or below the bottom surface of the base portion.

Figure 11:
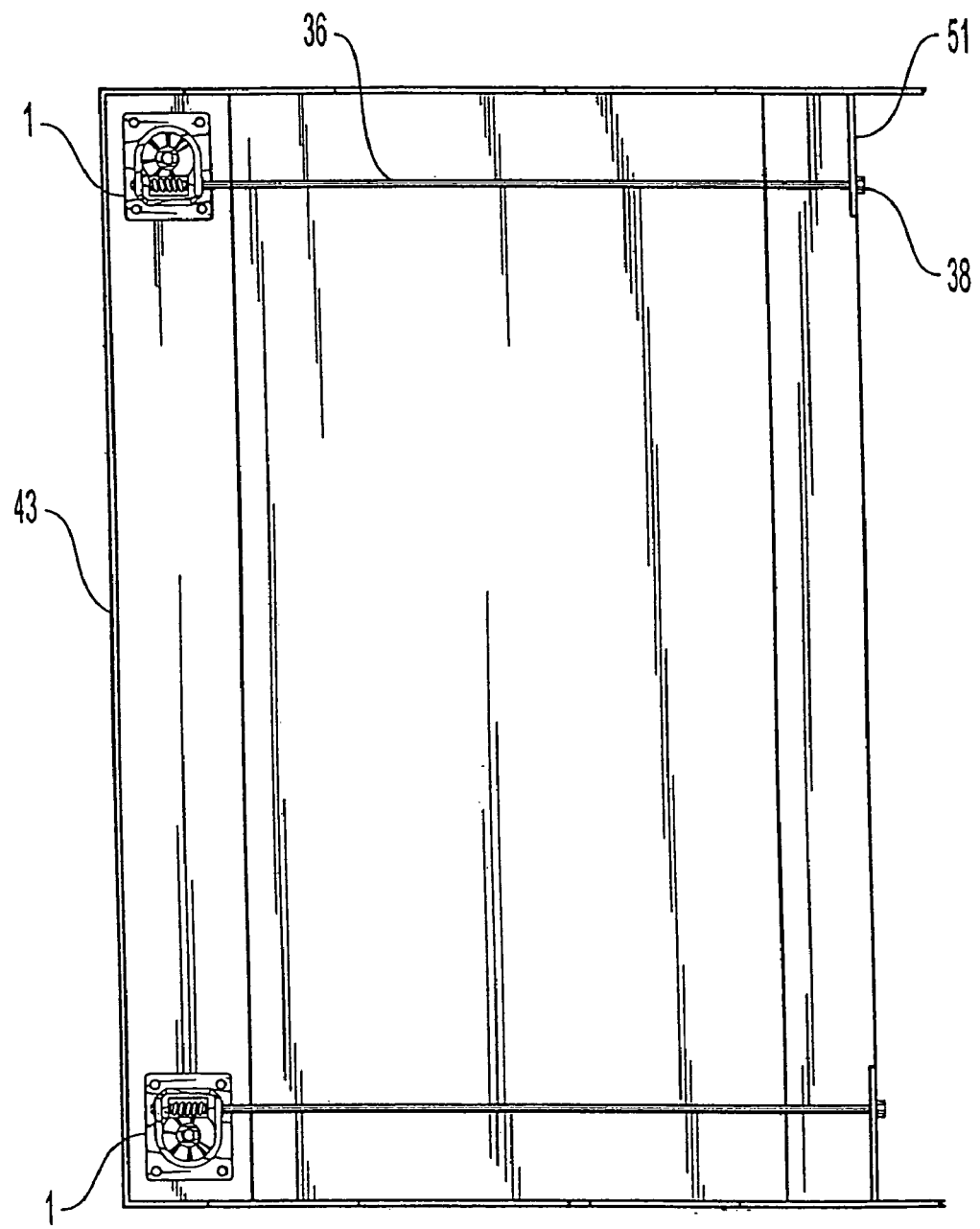
FIG. 11 is a top view of the base and bottom frame of an appliance showing the leveling device of the present invention installed near both rear corners of the appliance with the worm gear extension rods routed to the front of the appliance.

Preferably as shown in FIG. 11, at least two leveling devices 1 may be installed near each rear corner of the object 43 to serve as the rear supports. However, it will be readily appreciated that the leveling device 1 may be used with all supports that may be provided for the object 43, the number of leveling devices being a matter of design choice dependent on the size and weight of object. The extension rods 36 are shown in FIG. 11 as reaching from the leveling devices 1 to the front of the object where they are readily accessible by installers with tools.

Operation of the leveling device 1 will be described for an embodiment in which an object has two leveling devices, one each installed near the two rear corners of the object. After the object 43 is moved into its final position on a floor, it is ready to be leveled using the leveling devices 1. For this example, it is assumed that the pad 30 of each leveling device 1 is completely retracted into the housing 2 as described above and which is the preferred pre-leveling position of the pads. The installer applies a tool to the tooling end 38 of one leveling device's extension rod 36 and begins to rotate the extension rod in a predetermined direction that will lower the elevation shaft 21 toward the floor. This in turn rotates the worm gear 25 in the housing 2 of the leveling device 1 which is operably engaged with the teeth of the driven gear 14, whereupon concomitant rotations of the driven gear lowers the elevation shaft 21. As the shaft 21 is lowered, the pad first emerges from the housing 2 and engages the flooring surface. Continued rotation of the extension rod 36 in the same direction by the installer causes the object to then be raised or lifted off the flooring surface. The installer continues to raise the object 43 until the desired height is reached. It should be recognized that the installer may also lower the height of the object by reversing the direction in which the extension rod 36 was initially being rotated. After adjustments to the first leveling device 1 are completed, this same process is then repeated for the remaining leveling device. It will be apparent that the installer may make gradual adjustments to the height of each corner of the object 43, going back and forth between leveling devices 1, until the proper overall height of the object is reached and it is level. If an object 43 were provided which had more than two leveling devices 1 as just described (not shown), the same leveling procedure would be repeated for each leveling device.

It will be appreciated that the direction in which the installer must rotate the extension rod 36 to raise or lower the object 43 is dependent upon whether a worm gear with right-handed or left-handed threads is installed in the leveling device 1, and the horizontal orientation of the leveling device as installed in the object. In FIG. 11, for example, one rear corner leveling device 1 is shown as being installed in a position that has been horizontally turned 180 degrees from the other rear corner leveling device. This is desirable so that the elevation shaft 21 of each leveling device 1 which supports the weight of the object 43 are each equidistant from both rear corners of the object. Since it is preferable for an installer to be able to turn both extension rods 36 in the same direction to either raise or lower the object 43, a right-handed worm gear 25 may be used in one rear leveling device 1 while a left-handed worm gear may be used in the other. This avoids inconvenience to the installers and confusion.

In another embodiment shown in FIG. 10, the leveling device 1 is installed vertically inverted by 180 degrees from its normal orientation. When installed in an object 43 in the inverted position, the base portion 3 is at the top and the top portion 13 is at the bottom. Accordingly as shown, the full height of the housing projects downwards from the underside of the object 43. This is desirable in a number of applications, including, but not limited to large business machines (e.g., copiers, computers, sorters, etc.) and industrial equipment which may be fitted with both conventional fixed-height rollers (not shown in FIG. 10) and height-adjustable supports with pads. The rollers are used to make moving these often heavy objects 43 into place easier for installers. After the object 43 is rolled into its final position, the height-adjustable supports such as the leveling device 1 of the invention as depicted in FIG. 10 are used to slightly raise the object off the rollers (to prevent subsequent rolling of the machine) and level the object. It is therefore desirable to minimize the length of the elevation shaft 21 which would otherwise be long if the leveling device 1 were flush mounted to the underside of the object 43 in its normal orientation. It will be readily appreciated that the leveling device 1 may be installed in the inverted position and used alone without any concurrent use of rollers.

FIG. 10 also shows conventional hex head bolts 50 that may be inserted through hole 11 in the base portion 3 of the leveling device 1 to attach the leveling device to the object 43. As discussed above in reference to FIG. 9, any type or shape of bolt or screw may be used in conjunction with hole 11 for attaching the leveling device 1.

It should be recognized that a commercially available lubricant such as grease or oil may be applied to the teeth of the driven gear 14 and worm gear 25 to facilitate smooth operation of the leveling device 1. Lubricant may also applied to the upper flat surface of the driven gear 14 where it contacts the stepped transition 32 of the housing 2, and to the surfaces of any gear stems 16 if used to facilitate their rotation in the housing while under the loads described above (reference FIGS. 1B & 2B). Alternatively, a washer partially or fully coated with a non-stick, low friction polymeric material such as PTFE, FEP, PFA, ETFE, etc. may also be disposed between the upper surface of the driven gear 14 and the stepped transition 32, and between the free end of gear stem 16 and the top of the second internal compartment to facilitate rotation of driven gear and stem. Optionally, the non-stick material may be coated on the driven gear 14 and/or internal compartments 5 and 6 instead of, or in addition to, using non-stick washers. Although the use of lubricants and non-stick materials are described above, the leveling device 1 may be used without any of these.

It will be appreciated that the leveling device is not limited by the location where they may be mounted on the underside of an object. Although placement of the leveling device is preferably near the corners of an object, placement is a design choice and the invention is not limited to embodiments described herein having leveling devices mounted near the corners. In certain applications, and depending on the configuration and size of the object, it may be desirable to place the leveling devices at locations other than near the corners, or at additional locations besides near the corners.

It should be recognized that the leveling device 1 and its components are not limited by the type of material from which they may be constructed. Accordingly, plastics, plated or unplated metals and alloys, molded fiberglass, composites, press fitted combinations, etc. may be used alone or in combination for each component, the selection being a matter of design choice and requirements of the particular intended application.

The invention has broad applicability for use in many types of objects that require leveling and is not limited to the embodiments described herein. Thus, for example, the leveling device 1 can be used alone or in combination with conventional levelers in appliances, industrial machinery and equipment, office and business machines such as copiers, mail sorters, etc., electronic and computer equipment, medical and dental equipment, telecommunications equipment, recreational equipment, furniture, and others.

It will be recognized by those skilled in the art that the details of the leveling device described herein are a matter of design choice, and the invention is not limited to the particular embodiments and features described. Accordingly, numerous modifications may be made to the leveling device and its components without departing from the spirit of the invention and scope of the claims appended hereto.

What is claimed is:

1. A method of leveling an object comprising:
   (a) providing at least two bearing-less leveling devices each consisting essentially of:
   a housing having a base portion, a top portion, and a substantially hollow portion;
   an elevation shaft having thread and a longitudinal axis, the elevation shaft being disposed at least partially within the hollow portion;
   a worm gear having teeth disposed within the housing, at least one end of the worm gear having an extension protruding out from the housing and configured to receive a tool to facilitate rotation of the worm gear;
   a driven gear disposed within the hollow portion having internal threads engaged with the threads of the elevation shaft and external gear teeth engaged with the teeth of the worm gear;
   means for retaining the driven gear within the hollow portion; and
   means for restraining the elevation shaft from rotating relative to the housing,
   whereby upon rotation of the worm gear in opposite directions and concomitant rotations of the driven gear, the elevation shaft is caused to move axially up or down;
   (b) providing a tool configured to operably engage the at least one end of the worm gear extending out from the housing;
   (c) providing an object to which the at least two leveling devices are mounted, the object providing access for the tool to engage the at least two leveling devices;
   (d) engaging the tool with the extension of the at least one end of the worm gear protruding out from the housing of one of the at least two leveling devices; and
   (e) rotating the worm gear of one of the at least two leveling devices with the tool to raise or lower the object.

2. The method of claim 1 wherein the object is an appliance.

3. The method of claim 1 wherein the object is leveled by rotation of the worm gear of at least one of the leveling devices.

4. The method of claim 1 wherein the object is leveled by rotation of both worm gears of the at least two leveling devices.

5. The method of claim 1 wherein the means for retaining the driven gear within the substantially hollow portion is a collar fastened within an opening in the base portion.

6. The method of claim 1 wherein the means for retaining the driven gear within the substantially hollow portion is a load-bearing block fastened within an opening in the base portion, the block having a hole configured and adapted to receive the elevation shaft.

7. The method of claim 6 wherein the object further comprises a bottom and the at least two bearing-less leveling devices are mounted to the bottom of the object in an inverted position such that the top portion is below the bottom portion.

8. The method of claim 1, wherein the housing is made of plastic.

9. The method of claim 1, wherein the driven gear and worm gear are both made of plastic.

10. The method of claim 1, wherein the driven gear is a spur gear.

11. A method of leveling an object comprising:
(a) providing at least two bearing-less leveling devices each consisting essentially of:
a housing having a base portion, a top portion, and a substantially hollow portion;
an elevation shaft having threads and a longitudinal axis, the elevation shaft being disposed at least partially within the hollow portion;
a worm gear having teeth disposed within the housing, at least one end of the worm gear being configured to receive a tool to facilitate rotation of the worm gear;
a spur gear disposed within the hollow portion having internal threads engaged with the threads of the elevation shaft and external gear teeth engaged with the teeth of the worm gear;
means for retaining the spur gear within the hollow portion; and
means for restraining the elevation shaft from rotating relative to the housing,
whereby upon rotation of the worn gear in opposite directions and concomitant rotations of the spur gear, the elevation shaft is caused to move axially up or down;
(b) providing a tool configured to operably engage the at least one end of the worm gear;
(c) providing an object to which the at least two leveling devices are mounted, the object providing access for the tool to engage the at least two leveling devices;
(d) engaging the tool with the at least one end of the worm gear; and
(e) rotating the worm gear of one of the at least two leveling devices with the tool to raise or lower the object.

12. The method of claim 11, wherein the housing is made of plastic.

13. The method of claim 11, wherein the spur driven gear and worm gear are both made of plastic.

14. The method of claim 11, wherein the elevation shaft is made of metal.

15. The method of claim 11, wherein the means for restraining the elevation shaft from rotating relative to the housing includes a flat portion on the elevation shaft.

16. The method of claim 11, wherein the internal threads of the spur gear are disposed on a metal bushing inserted through the spur gear.

17. A method of leveling an object comprising:
(a) providing at least two bearing-less leveling devices each consisting essentially of:
a housing having a base portion, a top portion, and a substantially hollow portion;
an elevation shaft having threads and a longitudinal axis, the elevation shaft being disposed at least partially within the hollow portion;
a worm gear having teeth disposed within the housing, at least one end of the worm gear being configured to receive a tool to facilitate rotation of the worm gear;
a spur gear disposed within the hollow portion, the spur gear including a bushing with internal threads engaged with the threads of the elevation shaft and external gear teeth engaged with the teeth of the worm gear;
means for retaining the spur gear within the hollow portion; and
means for restraining the elevation shaft from rotating relative to the housing,
whereby upon rotation of the worm gear in opposite directions and concomitant rotations of the spur gear, the elevation shaft is caused to move axially up or down;
(b) providing a tool configured to operably engage the at least one end of the worm gear;
(c) providing an object to which the at least two leveling devices are mounted, the object providing access for the tool to engage the at least two leveling devices;
(d) engaging the tool with the at least one end of the worm gear; and
(e) rotating the worm gear of one of the at least two leveling devices with the tool to raise or lower the object.

18. The method of claim 17, wherein the spur gear and worm gear are both made of plastic.

19. The method of claim 18, wherein the elevation shaft and bushing are made of metal.

20. The method of claim 17, wherein the elevation shaft is made of metal.

21. The method of claim 17, wherein the housing, spur gear, and worm gear are all made of plastic.

* * * * *

UNITED STATES PATENT AND TRADEMARK OFFICE
CERTIFICATE OF CORRECTION

PATENT NO. : 7,258,313 B2
APPLICATION NO. : 10/809598
DATED : August 21, 2007
INVENTOR(S) : Edward Gabriel It is certified that error appears in the above-identified patent and that said Letters Patent is hereby corrected as shown below:

On the title page item (73),
Assignee name, delete "Sturm, Ruger & Company, Inc."

Signed and Sealed this

Fifth Day of February, 2008

JON W. DUDAS
*Director of the United States Patent and Trademark Office*